(12) United States Patent
Gao et al.

(10) Patent No.: US 11,172,220 B2
(45) Date of Patent: Nov. 9, 2021

(54) VIDEO ENCODING METHOD, AND STORAGE MEDIUM THEREOF

(71) Applicant: TENCENT TECHNOLOGY (SHENZHEN) COMPANY LIMITED, Shenzhen (CN)

(72) Inventors: Xinwei Gao, Shenzhen (CN); Xunan Mao, Shenzhen (CN); Chenchen Gu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/000,824

(22) Filed: Aug. 24, 2020

(65) Prior Publication Data

US 2020/0389665 A1    Dec. 10, 2020

Related U.S. Application Data

(63) Continuation of application No. PCT/CN2018/086266, filed on May 9, 2019.

(30) Foreign Application Priority Data

Jun. 20, 2018    (CN) .......................... 201810636918.3

(51) Int. Cl.
*H04N 11/02* (2006.01)
*H04N 19/59* (2014.01)
(Continued)

(52) U.S. Cl.
CPC .......... *H04N 19/59* (2014.11); *H04N 19/124* (2014.11); *H04N 19/132* (2014.11);
(Continued)

(58) Field of Classification Search
CPC .................................................... H04N 19/59
(Continued)

(56) References Cited

U.S. PATENT DOCUMENTS 5,825,927 A * 10/1998 Boyce .................... H04N 19/59
382/232
6,504,872 B1 * 1/2003 Fimoff .................. H04N 19/176
375/240.12

(Continued)

FOREIGN PATENT DOCUMENTS

CN    1622634 A    6/2005
CN    1684517 A    10/2005
(Continued)

OTHER PUBLICATIONS

International Search Report issued in International Application No. PCT/CN2019/086266, Chinese copy (English translation not yet available).

(Continued)

*Primary Examiner* — Leron Beck

(57) ABSTRACT

This application relates to a video encoding and decoding method. The video encoding method includes: obtaining a current frame from an input video; determining, from a plurality of processing modes, a target processing mode corresponding to the current frame, the candidate processing modes including a full-resolution processing mode or a downsampling processing mode; processing the current frame according to the target processing mode; and encoding the processed current frame according to resolution information to obtain encoded data corresponding to the current frame. According to the encoding method, a processing mode of a video frame can be flexibly selected, and a resolution of the input video frame is adaptively adjusted for encoding.

19 Claims, 13 Drawing Sheets

```
                                            ┌─ S802
┌──────────────────────────────────────────────────────┐
│ Determine a first vector conversion parameter         │
│ according to resolution information of a frame to be  │
│ encoded and first resolution information, the first   │
│ resolution information including resolution           │
│ information of a reference frame or target motion     │
│ vector unit resolution information corresponding to   │
│ a current frame                                       │
└──────────────────────────────────────────────────────┘
                        │
                        ▼         ┌─ S804
┌──────────────────────────────────────────────────────┐
│ Obtain a target motion vector corresponding to each   │
│ code block in the frame according to the first vector │
│ conversion parameter                                  │
└──────────────────────────────────────────────────────┘
```

(51) Int. Cl.
*H04N 19/124* (2014.01)
*H04N 19/132* (2014.01)
*H04N 19/147* (2014.01)
*H04N 19/176* (2014.01)
*H04N 19/513* (2014.01)
*H04N 19/523* (2014.01)

(52) U.S. Cl.
CPC ......... *H04N 19/147* (2014.11); *H04N 19/176* (2014.11); *H04N 19/513* (2014.11); *H04N 19/523* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 8,126,052 | B2* | 2/2012 | Suzuki | H04N 19/513 375/240.12 |
| 9,936,208 | B1* | 4/2018 | Brailovskiy | H04N 19/14 |
| 10,701,394 | B1* | 6/2020 | Caballero | G06N 3/08 |
| 2006/0072665 | A1* | 4/2006 | Cho | H04N 19/196 375/240.16 |
| 2006/0245502 | A1* | 11/2006 | Cheng | H04N 19/147 375/240.24 |
| 2007/0211798 | A1* | 9/2007 | Boyce | H04N 19/59 375/240.16 |
| 2009/0154563 | A1* | 6/2009 | Hong | H04N 19/533 375/240.16 |
| 2010/0208086 | A1 | 8/2010 | Kothandaraman et al. | |
| 2011/0013692 | A1* | 1/2011 | Cohen | H04N 19/59 375/240.02 |
| 2011/0170595 | A1* | 7/2011 | Shi | H04N 19/59 375/240.16 |
| 2014/0267833 | A1 | 9/2014 | Chen et al. | |
| 2019/0253704 | A1 | 8/2019 | Mao et al. | |

FOREIGN PATENT DOCUMENTS

| | | |
|---|---|---|
| CN | 103813174 A | 5/2014 |
| CN | 104410861 A | 3/2015 |
| CN | 105187824 A | 12/2015 |
| CN | 107155107 A | 9/2017 |
| CN | 108833917 A | 11/2018 |

OTHER PUBLICATIONS

Office Action and Search Report of Chinese Application 2018106369183 dated Mar. 18, 2021, 11 pages.
Extended European Search Report on European Application 19823126.8 dated Sep. 29, 2021, 12 pages.

* cited by examiner

|     |     |     |     |     |     |     |
|-----|-----|-----|-----|-----|-----|-----|
| ... | ... | ... | ... | ... | ... | ... |
| ... | C1  | c11 | A1  | a11 | B1  | b11 | ... |
| ... | c13 | c12 | a13 | a12 | b13 | b12 | ... |
| ... | C2  | c21 | A2  | a21 | B2  | b21 | ... |
| ... | c23 | c22 | a23 | a22 | b13 | b22 | ... |
| ... | C3  | c31 | A3  | a31 | B3  | b31 | ... |
| ... | c33 | c32 | a33 | a32 | b33 | b32 | ... |
| ... | ... | ... | ... | ... | ... | ... |

FIG. 7B

| C1  | ... | ... | ... | A1  | ... | ... | ... | B1  |
|-----|-----|-----|-----|-----|-----|-----|-----|-----|
| ... | ... | ... | ... | ... | ... | ... | ... | ... |
| ... | ... | ... | ... | ... | ... | ... | ... | ... |
| ... | ... | ... | ... | ... | ... | ... | ... | ... |
| C2  | ... | ... | ... | A2  | a4  | a8  | a12 | B2  |
| ... | ... | ... | ... | a1  | a5  | a9  | a13 | ... |
| ... | ... | ... | ... | a2  | a6  | a10 | a14 | ... |
| ... | ... | ... | ... | a3  | a7  | a11 | a15 | ... |
| C3  | ... | ... | ... | A3  | ... | ... | ... | B3  |

FIG. 7C

S802
Determine a first vector conversion parameter according to resolution information of a frame to Be encoded and first resolution information, the first resolution information including resolution information of a reference frame or target motion vector unit resolution information corresponding to a current frame S804
Obtain a target motion vector corresponding to each code block in the frame according to the first vector conversion parameter

FIG. 8A

VIDEO ENCODING METHOD, AND STORAGE MEDIUM THEREOF

RELATED APPLICATION

This application is a continuation application of PCI Patent Application No. PCT/CN2019/086266, filed on May 9, 2019, which claims priority to Chinese Patent Application No. 201810636918.3, entitled "VIDEO ENCODING AND DECODING METHOD AND APPARATUS, COMPUTER DEVICE, AND STORAGE MEDIUM" filed on Jun. 20, 2018, wherein the entirety of each of the above-referenced applications is incorporated by reference in its entirety.

FIELD OF THE TECHNOLOGY

This application relates to the field of computer technologies, and in particular, to a video encoding and decoding method and apparatus, a computer device, and a storage medium.

BACKGROUND OF THE DISCLOSURE

With the development of digital media technologies and computer technologies, videos are applied to various fields, such as mobile communication, network monitoring, and network television. With the improvement of hardware performance and screen resolution, users' demand for high-definition videos is increasing.

Under the condition of a limited bandwidth, conventional encoders indiscriminately encode video frames. This may lead to poor video quality in some scenarios. For example, at 750 kbps, when all video frames are indiscriminately encoded, some video frames have poor quality, and upon analysis of encoders such as H.264\H.265\iOS, a similar problem exists.

SUMMARY

Embodiments of this application provide a video encoding and decoding method and apparatus, a computer device, and a storage medium, so that a target processing mode of a video frame can be flexibly selected to process an input video frame, and a resolution of the input video frame is adaptively adjusted and then encoding is performed. In this way, video encoding quality can be improved under a condition of a limited bandwidth, and encoding is performed according to resolution information corresponding to a frame to be encoded, so that accurate encoded data can be obtained.

A video encoding method is provided, including: obtaining a current frame from an input video; determining, from a plurality of processing mode, a target processing mode corresponding to the current frame; processing the current frame according to the target processing mode; and encoding the processed current frame according to resolution information to obtain encoded data corresponding to the current frame.

A video encoding apparatus is provided, including: an input video frame obtaining module, configured to obtain a frame from an input video; a processing mode obtaining module, configured to determine, from a plurality of processing modes, a target processing mode corresponding to the current frame, the plurality of processing modes including a full-resolution processing mode, and a down-sampling processing mode; a processing module, configured to process the current frame according to the target processing mode; and an encoding module, configured to encode the processed current frame according to resolution information to obtain encoded data corresponding to the input video frame.

A computer device is provided, including a memory and a processor, the memory storing a computer program, the computer program, when executed by the processor, causing the processor to perform the operations of the foregoing video encoding method.

A non-volatile computer-readable storage medium is provided, storing a computer program, the computer program, when executed by a processor, causing the processor to perform the operations of the foregoing video encoding method.

According to the foregoing video encoding method and apparatus, the computer device, and the storage medium, during encoding, the current frame is obtained from the input video, the corresponding target processing mode is determined from a plurality of processing modes, the plurality of processing modes including a full-resolution processing mode and a down-sampling processing mode, and the current frame from the input video is processed according to the target processing mode. The current frame is encoded according to the corresponding resolution information. Therefore, the processing mode of the video frame can be flexibly selected to process the current frame from the input video, and the resolution of the current frame is adaptively adjusted. In this way, video encoding quality can be improved under a condition of a limited bandwidth, and encoding is performed according to the resolution information corresponding to the processed current frame, so that accurate encoded data can be obtained.

A video decoding method is provided, including: obtaining encoded data corresponding to a video frame to be decoded; obtaining resolution information corresponding to the video frame; decoding the encoded data according to the resolution information corresponding to the video frame to obtain a reconstructed video frame; and processing the reconstructed video frame according to the resolution information to obtain a decoded video frame.

A video decoding apparatus is provided, including: an encoded data obtaining module, configured to obtain encoded data corresponding to a video frame to be decoded; a resolution information obtaining module, configured to obtain resolution information corresponding to the video frame; a reconstruction module, configured to decode the encoded data according to the resolution information corresponding to video frame, to obtain a reconstructed video frame; and a decoded video frame obtaining module, configured to process the reconstructed video frame according to the resolution information to obtain a decoded video frame.

A computer device is provided, including a memory and a processor, the memory storing a computer program, the computer program, when executed by the processor, causing the processor to perform the operations of the foregoing video decoding method.

A non-volatile computer-readable storage medium is provided, storing a computer program, the computer program, when executed by a processor, causing the processor to perform the operations of the foregoing video decoding method.

According to the foregoing video decoding method and apparatus, the computer device, and the storage medium, the encoded data corresponding to the video frame to be decoded is obtained, the resolution information corresponding to the video frame is obtained, and the encoded data is decoded according to the resolution information corresponding to the video frame, to obtain the reconstructed video frame corresponding to the video frame, and the reconstructed video frame is processed according to the resolution information corresponding to the video frame, to obtain the corresponding decoded video frame. Therefore, during decoding, decoding can be flexibly performed according to the resolution information corresponding to the video frame, to obtain the decoded video frame, and decoding is performed according to the resolution information of the video frame, so that an accurate decoded video frame can be obtained.

BRIEF DESCRIPTION OF THE DRAWINGS

FIG. 7B is a schematic diagram of performing interpolation on a reference frame according to an embodiment.

FIG. 7C is a schematic diagram of performing interpolation on a reference frame according to an embodiment.

FIG. 8A is a flowchart of encoding a frame according to resolution information corresponding to the frame and a reference frame, to obtain encoded data corresponding to an input video frame according to an embodiment.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

It may be understood that the terms "first", "second" and the like used in this application may be used for describing various elements in this specification. However, the elements are not limited by the terms unless otherwise specified. The terms are merely used to distinguish a first element from another element. For example, without departing from the scope of this application, a first vector conversion coefficient may be referred to as a second vector conversion coefficient, and similarly, the second vector conversion coefficient may be referred to as the first vector conversion coefficient.

Figure 1:
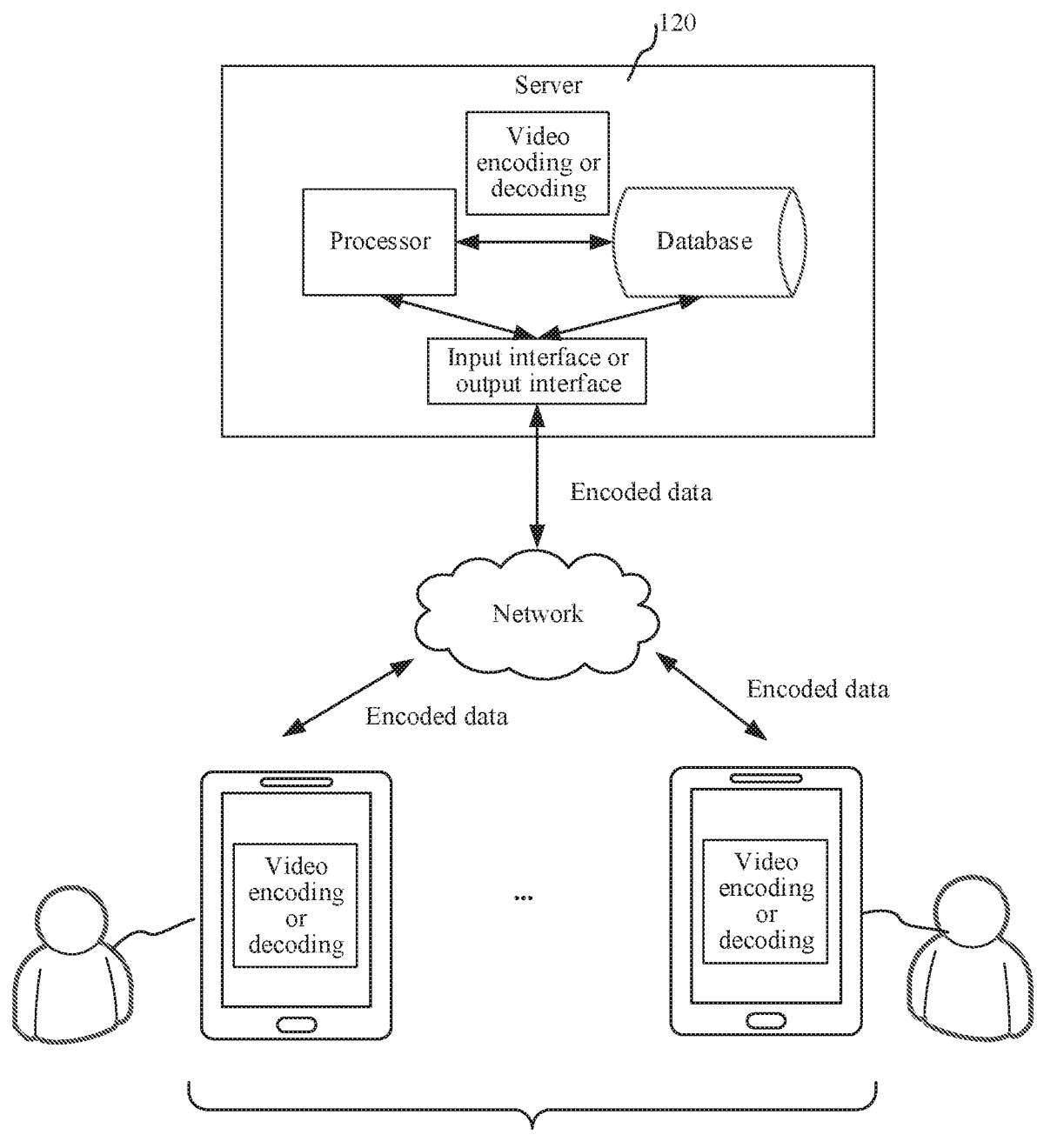
FIG. 1 is a diagram of an application environment of a video encoding method according to an embodiment.

FIG. 1 is a diagram of an application environment of a video encoding method according to an embodiment. As shown in FIG. 1, a terminal 110 and a server 120 are included in the application environment.

The terminal 110 or the server 120 may perform video encoding by using an encoder, or perform video decoding by using a decoder. The terminal 110 or the server 120 may also perform video encoding by using a processor running a video encoding program or video decoding by using a processor running a video decoding program. After receiving, through an input interface, encoded data sent by the terminal 110, the server 120 may directly transfer the encoded data to the processor for decoding, or may store the encoded data in a database for subsequent decoding. After obtaining the encoded data by encoding an original video frame by using a processor, the server 120 may directly send the encoded data to the terminal 110 through an output interface, or may store the encoded data in a database for subsequent transfer. Certainly, the server 120 may alternatively send, to a corresponding receiving terminal, the encoded data sent by the terminal 110 after receiving the encoded data, and the receiving terminal decodes the encoded data.

The terminal 110 and the server 120 may be connected through a network. The terminal 110 may be a desktop terminal or a mobile terminal, and the mobile terminal may be at least one of a mobile phone, a tablet computer, a notebook computer, and the like, but is not limited thereto. The server 120 may be implemented by an independent server or a server cluster that includes a plurality of servers.

Figure 2:
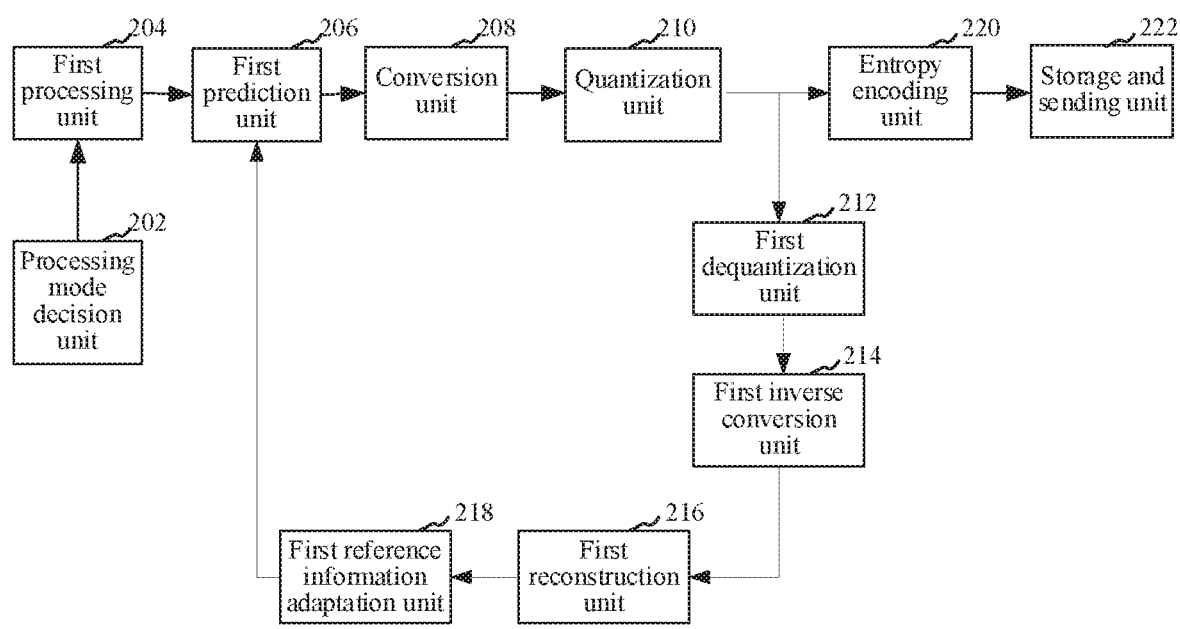
FIG. 2 is an encoding framework diagram corresponding to a video encoding method according to an embodiment.

FIG. 2 is an encoding framework diagram corresponding to a video encoding method according to an embodiment. According to the video encoding method provided in this embodiment of this application, each input video frame of an input video sequence may be obtained for encoding, to obtain corresponding encoded data. The encoded data is stored or sent by using a storage and sending unit 222, or is stored and sent by using the storage and sending unit 222. At a processing mode decision unit 202, a processing mode of an input video frame may be decided, to obtain a target processing mode corresponding to the input video frame. At a first processing unit 204, the input video frame may be processed according to the target processing mode, to obtain a frame. At a first prediction unit 206, intra prediction or inter prediction may be performed on each code block of a frame according to resolution information of the frame, and a predicted value and a corresponding motion vector are obtained according to an image value of a reference block corresponding to the code block, and the predicted value is subtracted from an actual value of the code block, to obtain a prediction residual, where the motion vector represents displacement of the code block relative to the reference block. At a conversion unit 208, a prediction residual and vector Information in spatial domain are converted to frequency domain, and a conversion coefficient may be encoded. A conversion method may be discrete Fourier transform, discrete cosine transform, or the like. The vector information may be an actual motion vector representing displacement or a motion vector difference. The motion vector difference is a difference between the actual motion vector and a predicted motion vector.

At a quantization unit 210, converted data is mapped into another value. For example, the converted data may be divided by a quantization step to obtain a relatively small value. A quantization parameter is a sequence number corresponding to the quantization step, and a corresponding quantization step may be found according to the quantization parameter. A small quantization parameter indicates reservation of most details of an image frame and a high corresponding code rate, A large quantization parameter indicates a low corresponding code rate, but relatively large distortion and low quality of an image. A principle of quantization is expressed by using the following formula: FQ=round(y/Qstep), y is a value corresponding to a video frame before quantization is performed, Qstep is a quantization step, and FQ is a quantized value obtained after y is quantized. The round(x) function is to round a value, that is, rounding. A correspondence between the quantization parameter and the quantization step may be specifically set according to a requirement. For example, in some video encoding standards, for luminance encoding, the quantization step has a total of 52 values that are integers from 0 to 51. For chrominance encoding, the quantization step has values that are integers from 0 to 39. In addition, the quantization step increases as the quantization parameter increases. Each time the quantization parameter is increased by 6, the quantization step is doubled.

An entropy encoding unit 220 is configured to perform entropy encoding. The entropy encoding is a data encoding mode of encoding based on an entropy principle without losing any information, and information can be expressed by using a relatively small character. A method for entropy encoding may be, for example, Shannon encoding or Huffman encoding.

A first dequantization unit 212, a first inverse conversion unit 214, a first reconstruction unit 216, and a first reference information adaptation unit 218 are units corresponding to a reconstruction path. A reference frame is obtained by reconstructing a frame by using units of the reconstruction path, so that reference frames in encoding and decoding can be kept consistent. A step performed by the first dequantization unit 212 is to perform an inverse process of quantization, A step performed by the first inverse conversion unit 214 is an inverse process of conversion performed by the conversion unit 208. The first reconstruction unit 216 is configured to add residual data obtained through inverse conversion and predicted data to obtain a reconstructed reference frame. The first reference information adaptation unit 218 is configured to perform, according to resolution information of a frame to be encoded, adaptation on at least one type of the following reference information: a reference frame obtained through reconstruction, location information corresponding to each code block of the frame, location information corresponding to each reference block in the reference frame, and a motion vector, so that the first prediction unit 206 performs prediction according to the reference information on which adaptation is performed.

Figure 3:
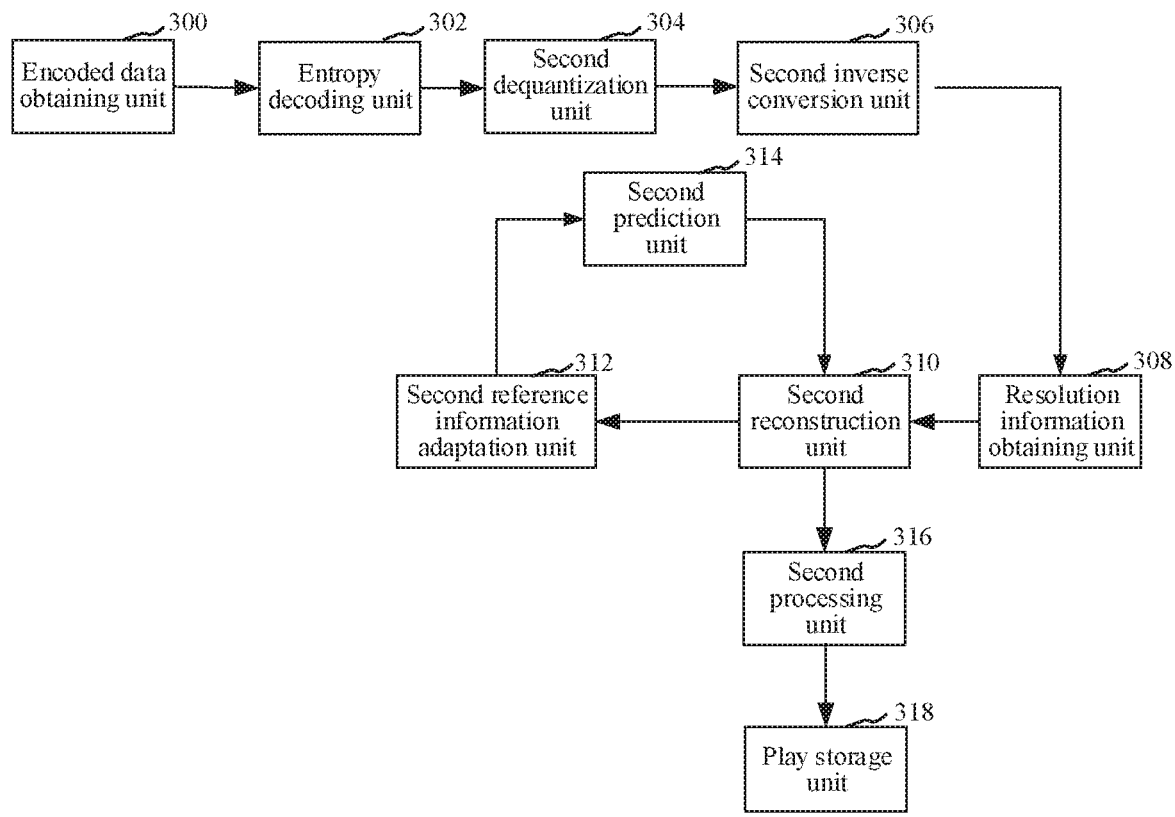
FIG. 3 is a decoding framework diagram corresponding to a video decoding method according to an embodiment.

FIG. 3 is a decoding framework diagram corresponding to a video decoding method according to an embodiment. According to the video decoding method provided in this embodiment of this application, encoded data corresponding to each video frame of a video frame may be obtained by an encoded data obtaining unit 300. An entropy decoding unit 302 performs entropy decoding, to obtain entropy decoded data. A second dequantization unit 304 performs dequantization on the entropy decoded data, to obtain dequantized data. A second inverse conversion unit 306 performs inverse conversion on the dequantized data, to obtain inverse-converted data. The inverse-converted data may be consistent with data obtained after inverse conversion is performed by the first inverse conversion unit 214 in FIG. 2. A resolution information obtaining unit 308 is configured to obtain resolution information corresponding to the video frame. A second reference information adaptation unit 312 is configured to: obtain the reference frame obtained through reconstruction performed by a second reconstruction unit, and perform, according to the resolution information of the video frame, adaptation on at least one type of the following reference information: the reference frame, location information corresponding to each block of the video frame, location information corresponding to each reference block in the reference frame, and a motion vector, so that the prediction is performed according to the information on which adaptation is performed. A second prediction unit 314 obtains a reference block corresponding to the block according to the reference information obtained after adaptation is performed, and obtains a predicted value consistent with the predicted value in FIG. 2 according to an image value of the reference block. The second reconstruction unit 310 performs reconstruction according to the predicted value and the prediction residual to obtain a reconstructed video frame. A second processing unit 316 processes the reconstructed video frame according to the resolution information corresponding to the video frame, to obtain a corresponding decoded video frame. A play storage unit 318 may play or store the decoded video frame, or play and store the decoded video frame.

It may be understood that the foregoing encoding framework diagram and decoding framework diagram are merely an example, and do not constitute a limitation to the encoding and decoding method to which the solution of this application is applied. The encoding framework diagram and decoding framework diagram may include more or fewer units than those shown in the figures, or some units are combined, or different component units are included. For example, loop filtering may also be performed on the reconstructed video frame, to alleviate a blocking effect of a video frame, and improve video quality.

In the embodiments of this application, an end performing encoding is referred to as an encoder, and an end performing decoding is referred to as a decoder. The encoder and the decoder may be the same end or different ends. The foregoing computer device, such as a terminal or a server, may be an encoder or a decoder.

Figure 4:
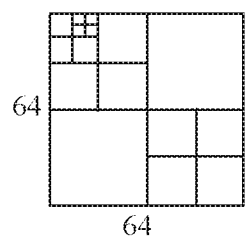
FIG. 4 is a schematic diagram of a code block according to an embodiment.

A frame to be encoded may be divided into a plurality of code blocks, and a size of a code block may be set or calculated according to a requirement. For example, the sizes of the code blocks may all be 8*8 pixels. Alternatively, a dividing manner with a small rate-distortion cost may be selected by calculating rate-distortion costs corresponding to various dividing manners of code blocks, to divide the code blocks. FIG. 4 is a schematic diagram of dividing an image block of 64*64 pixels. One block represents one code block. It can be learned from FIG. 4 that, sizes of code blocks may include 32*32 pixels, 16*16 pixels, 8*8 pixels, and 4*4 pixels. Certainly, sizes of code blocks may also be other sizes, such as 32*16 pixels or 64*64 pixels. It may be understood that, during decoding, because code blocks are in a one-to-one correspondence to blocks to be decoded, sizes of pixels of the blocks may include 32*32 pixels, 16*16 pixels, 8*8 pixels, 4*4 pixels, and the like.

Figure 5A:
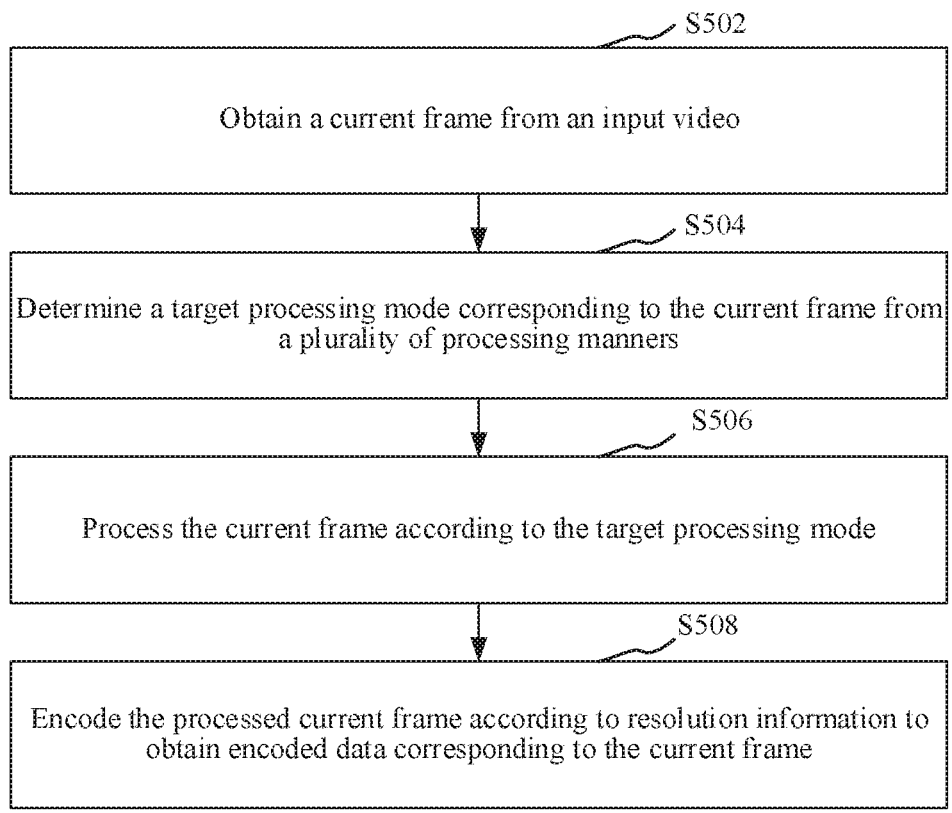
FIG. 5A is a flowchart of a video encoding method according to an embodiment.

As shown in FIG. 5A, in an embodiment, a video encoding method is provided. In this embodiment, applying the method to the terminal 110 or the server 120 in the foregoing FIG. 1 is mainly used as an example for description. The method may include the following steps:

Step S502: Obtain an Input Video Frame.

For example, a video frame is a unit that forms a video, and one video sequence may include a plurality of input video frames. The input video frame may be a video frame collected by a computer device in real time, for example, a video frame obtained in real time by a camera of a terminal, or a video frame corresponding to a stored video sequence. The input video frame may determine a corresponding encoded frame predicted type according to an encoding algorithm. The encoded frame predicted type may be an I frame, a P frame, or a B frame. The 1 frame is an intra predicted frame, the P frame is a forward predicted frame, the B frame is a bidirectional predicted frame, and code blocks of the P frame and the B frame may be encoded in an intra prediction manner or an inter prediction manner.

Step S504: Determine, from candidate processing modes, a target processing mode corresponding to the input video frame, the candidate processing modes including a full-resolution processing mode, and a downsampling processing mode.

For example, the target processing mode corresponding to the input video frame may be selected by a computer device from the candidate processing modes, and the candidate processing modes may include the full-resolution processing mode, and the downsampling processing mode. A method for obtaining the target processing mode corresponding to the input video frame may be set according to an actual requirement. For example, a processing parameter corresponding to the input video frame may be obtained, and the corresponding target processing mode is obtained according to the processing parameter. The processing mode is a parameter used for determining the processing mode. The processing parameter adopted may be set according to a requirement. For example, the processing parameter may include current encoded data corresponding to the input video frame and one or more pieces of information in image characteristic information. In an embodiment, when the target processing mode corresponding to the input video frame includes the downsampling processing mode, the computer device may further obtain a downsampling proportion and a downsampling method. A sampling proportion is a ratio obtained by dividing a resolution after sampling by a resolution before sampling. The downsampling method may use a direct average method, a filter, bicubic interpolation, bilinear interpolation, or the like. The downsampling proportion may be preset, or may be flexibly adjusted. For example, the downsampling proportions may all be set to 1/2. A downsampling proportion of the first input video frame of the input video frame may be 1/2, and a downsampling proportion of the second input video frame may be 1/4. The downsampling proportion may be obtained according to an encoding location of the input video frame in a group of pictures, and a more behind encoding location indicates a smaller downsampling proportion. A downsampling direction may be one of vertical downsampling, horizontal downsampling, and a combination of vertical downsampling and horizontal downsampling. If a resolution of a video frame before sampling is 800*800 pixels, when a downsampling proportion is 1/2 and horizontal downsampling is performed, a resolution of the video frame after sampling is 400*800 pixels. When the downsampling proportion is 1/2 and vertical downsampling is performed, a resolution of the video frame after sampling is 800*400 pixels.

In an embodiment, the downsampling proportion may be obtained according to a processor processing capability of a device performing the video encoding method, such as a terminal or a server. A device having a strong processor processing capability corresponds to a large downsampling proportion, and a device having a weak processor processing capability corresponds to a small downsampling proportion. A correspondence between the processor processing capability and the downsampling proportion may be set. When encoding needs to be performed, the processor processing capability is obtained, and the corresponding downsampling proportion is obtained according to the processor processing capability. For example, a downsampling proportion corresponding to a 16-bit processor may be set to 1/8, and a downsampling proportion corresponding to a 32-bit processor may be set to 1/4.

In an embodiment, the downsampling proportion may be obtained according to a frequency or a quantity of times that the input video frame is used as a reference frame, and a correspondence between the downsampling proportion and the frequency or the quantity of times that the input video frame is used as the reference frame may be set, A higher frequency or a larger quantity of times that the input video frame is used as the reference frame indicates a larger downsampling proportion. A lower frequency or a smaller quantity of times that the input video frame is used as the reference frame indicates a smaller downsampling proportion. For example, for the I frame, a high frequency that the I frame is used as the reference frame indicates a large corresponding downsampling proportion, which may be 1/2. For the P frame, a low frequency that the P frame is used as the reference frame indicates a small corresponding downsampling proportion, which may be, for example, 1/4. The downsampling proportion is obtained according to the frequency or the quantity of times that the input video frame is used as the reference frame. When the frequency or the quantity of times that the input video frame is used as the reference frame is large, image quality is relatively good, and therefore, prediction accuracy can be improved, a prediction residual can be reduced, and quality of an encoded image can be improved.

In an embodiment, a downsampling method may be obtained according to a processor processing capability of a device performing the video encoding method, such as a terminal or a server. A downsampling method corresponding to a device having a strong processor processing capability has high complexity, and a downsampling method corresponding to a device having a weak processor processing capability has low complexity. A correspondence between the processor processing capability and the downsampling method may be set. When encoding needs to be performed, a processor processing capability is obtained, and a corresponding downsampling method is obtained according to the processor processing capability. For example, complexity of bicubic interpolation is higher than that of bilinear interpolation. Therefore, a downsampling method corresponding to a 16-bit processor may be set to bilinear interpolation, and a downsampling method corresponding to a 32-bit processor may be set to bicubic interpolation.

In this embodiment of this application, when the input video frame is processed in the downsampling processing mode, downsampling may also be performed according to different downsampling methods or downsampling proportions, and a mode of processing the input video frame is more flexible.

In an embodiment, the computer device may obtain the target processing mode corresponding to the input video frame according to the current encoding information corresponding to the input video frame and one or more pieces of information in the image characteristic information. The current encoding information of a video is video compression parameter information obtained during encoding, for example, one or more of a frame predicted type, a motion vector, a quantization parameter, a video source, a code rate, a frame rate, and a resolution. The image characteristic information is information related to image content, and includes one or more of image motion information and image texture information, such as an edge. The current encoding information and the image characteristic information reflect a scenario corresponding to a video frame, detail complexity, motion intensity, and the like. For example, a motion scenario may be determined by using one or more of a motion vector, a quantization parameter, or a code rate. A large quantization parameter generally indicates high motion intensity, and a large motion vector indicates that an image scenario is a large motion scenario. Determining may also be performed according to a ratio of a code rate of an encoded I frame to that of an encoded P frame or a ratio of the code rate of the encoded I frame to that of an encoded B frame. When the ratio exceeds a first preset threshold, it is determined that an image is a still image, or when the ratio is less than a second preset threshold, it may be determined that an image is an image with high motion intensity. Alternatively, a target object is directly tracked according to image content, and whether a scenario is a large motion scenario is determined according to a motion speed of the target object. A fixed code rate indicates a fixed amount of information that can be expressed. For a scenario with high motion intensity, an amount of information in a time field is large, and accordingly, a code rate that can be used for expressing information in a spatial field is small. Therefore, a relatively good image quality effect can be achieved by using a low resolution, and it is more inclined to select a downsampling mode for encoding. An image switching scenario may be determined according to the frame predicted type, and a preferred processing mode may also be determined according to impact of the frame predicted type on other frames. For example, an I frame is generally the first frame, or image switching may exist, and quality of the I frame affects quality of a subsequent P frame or B frame. Therefore, an intra predicted frame is more inclined to select a full-resolution processing mode compared with an inter predicted frame, to ensure image quality. The P frame may be used as the reference frame of the B frame, and image quality of the P frame affects image quality of the subsequent B frame. Therefore, a full-resolution processing mode is more inclined to be selected in encoding by using the P frame compared with encoding by using the B frame. Texture complexity of the video frame to be encoded is determined according to the image characteristic information, for example, image texture information. If texture is complex and includes a large number of details, there is a large amount of image spatial Information. If downsampling is performed, a relatively large amount of detail information may be lost due to the downsampling, and video quality is affected. Therefore, a video frame to be encoded having a complex texture is more inclined to select full-resolution processing compared with that having a simple texture.

In an embodiment, the computer device may obtain the target processing mode corresponding to the input video frame according to the size relationship between the current quantization parameter corresponding to the input video frame and the quantization parameter threshold. If the current quantization parameter is greater than the quantization parameter threshold, the processing mode is determined as the downsampling mode, and otherwise, the processing mode is determined as the full-resolution processing mode. The quantization parameter threshold may be obtained according to a proportion of an intra-frame code block in an encoded forward encoded video frame before the input video frame. For example, a correspondence between the proportion of an intra predicted block and the quantization parameter threshold may be set, so that a quantization parameter threshold corresponding to a proportion of an intra predicted block of a current frame may be determined according to the correspondence after the proportion of the intra predicted block of the current frame is determined. For fixed quantization parameter encoding, the current quantization parameter may be a corresponding fixed quantization parameter value. For fixed code rate encoding, a current quantization parameter corresponding to the input video frame may be calculated according to a code rate control model. Alternatively, a quantization parameter corresponding to a reference frame may be used as the current quantization parameter corresponding to the input video frame. In this embodiment of this application, a larger current quantization parameter generally indicates higher motion intensity, and the downsampling processing mode is more inclined to be selected for a scenario having high motion intensity.

In an embodiment, a relationship between the proportion of the intra predicted block and the quantization parameter threshold is a positive correlation. For example, a correspondence between the proportion $Intra_0$ of the intra predicted block and the quantization parameter threshold $QP_{TH}$ may be determined according to experience as follows:

$$QP_{TH} = \begin{cases} 33, & Intra_0 < 10\% \\ 31, & 10\% \leq Intra_0 < 50\% \\ 29, & Intra_0 \geq 50\% \end{cases}$$

In an embodiment, the candidate processing modes may further include an upsampling processing mode. When the candidate processing modes include the upsampling processing mode, upsampling is performed on the input video frame when the target processing mode is the upsampling processing mode. For example, for some input video frames with resolutions lower than a preset resolution, upsampling may be performed on the input video frame, to improve playback quality of the video frame.

In an embodiment, a method for performing upsampling and an upsampling proportion may be set according to requirements, or the method for performing upsampling and the proportion may be flexibly adjusted. For example, complexity of an upsampling method corresponding to a computer device having a strong processor processing capability is high. A fixed upsampling method may alternatively be set to upsample the input video frame. For the upsampling proportion, a fixed upsampling proportion may be set, or the upsampling proportion may be determined according to the playback quality. Generally, a higher requirement on playback quality indicates a larger upsampling proportion.

Step S506: Process the input video frame according to the target processing mode, to obtain a frame to be encoded.

For example, the frame is obtained by processing the input video frame by the computer device according to the target processing mode. When the target processing mode is the full-resolution processing mode, the computer device uses the input video frame as the frame, that is, a resolution of the input video frame is the same as a resolution of the frame. When the processing mode is the downsampling processing mode, the computer device performs downsampling on the input video frame, to obtain the frame, that is, the resolution of the input video frame is less than the resolution of the frame. For example, when the resolution of the input video frame is 800'300 pixels, and the processing mode is that 1/2 downsampling is performed in both the horizontal direction and the vertical direction, a resolution of the frame obtained through downsampling is 400*400 pixels.

Step S508: Encode the frame to be encoded according to resolution information corresponding to the frame, to obtain encoded data corresponding to the input video frame.

For example, the resolution information is information related to a solution, and for example, may include one or more of a sampling proportion and a resolution. Encoding may include one or more of prediction, conversion, quantization, and entropy encoding. When the frame is an I frame, the computer device performs intra prediction on the frame according to resolution information corresponding to the frame. When the frame is a P frame or a B frame, the computer device may obtain a reference frame corresponding to the frame, predict the reference frame to obtain a prediction residual, and perform conversion, quantization, and entropy encoding on the prediction residual, to obtain the encoded data corresponding to the input video frame. In a process of obtaining the encoded data, the computer device processes one or more of a reference frame, location information corresponding to each code block of the frame, location information corresponding to each reference block in the reference frame, and a motion vector according to the resolution information of the frame. For example, during calculation of the prediction residual, the reference frame may be processed according to the resolution information of the frame, to obtain the target reference frame, and a target reference block corresponding to each code block in the frame is obtained from the target reference frame, and prediction is performed according to the target reference block, to obtain a predicted value corresponding to the code block, and then the prediction residual is obtained according to a difference between an actual value of the code block and the predicted value. During calculation of a target motion vector, if the resolution of the reference frame is different from the resolution of the frame, location information of the code block or location information of a decoding block may be converted according to the resolution information of the reference frame and the resolution information of the frame, so that the location information of the frame and the location information of the reference frame are in a same quantization scale. Subsequently, the target motion vector is obtained according to the converted location information, to reduce a value of the target motion vector, and reduce a data amount of the encoded data. If the resolution information corresponding to the target motion vector is different from the resolution information of the frame, when the first motion vector corresponding to a code block of the frame is calculated, the first motion vector is converted according to the resolution information of the frame and target motion vector unit resolution information, to obtain the target motion vector in a target resolution. For example, it is assumed that the resolution of the frame is 400*800 pixels, and the resolution of the reference frame is 800*1600 pixels. Then, 1/2 downsampling may be performed on the reference frame according to the resolution of the frame, to obtain that the resolution of the target reference frame is 400*800 pixels, and then video encoding is performed according to the target reference frame.

In this embodiment of this application, during encoding, the input video frame is obtained, and the target processing mode corresponding to the input video frame is determined from the candidate processing modes, the candidate processing modes including the full-resolution processing mode and the downsampling processing mode, and the input video frame is processed according to the target processing mode, to obtain the frame. The frame is encoded according to the resolution information corresponding to the frame, to obtain the encoded data corresponding to the input video frame. Therefore, a processing mode of the video frame can be flexibly selected, to process the input video frame and adaptively adjust the resolution of the input video frame, so that video encoding quality is improved under a condition of a limited bandwidth, and encoding is performed according to the resolution information corresponding to the frame, so that accurate encoded data can be obtained.

In an embodiment, after the encoding the frame according to resolution information corresponding to the frame, to obtain encoded data corresponding to the input video frame, the method further includes adding target processing mode information corresponding to the target processing mode to the encoded data corresponding to the input video frame.

Figure 5B:
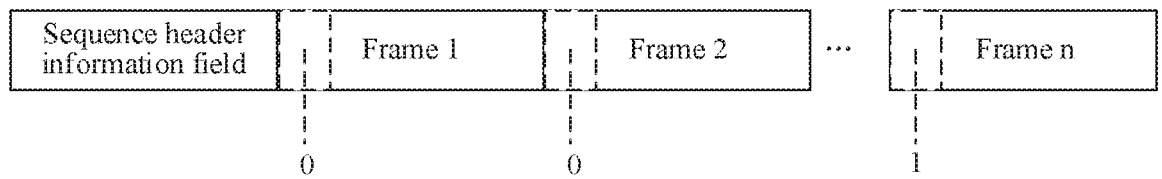
FIG. 5B is a schematic diagram of encoded data according to an embodiment.

For example, the target processing mode information is used for describing the target processing mode used by the input video frame. The computer device may add a flag bit Frame_Resolution_Flag describing the processing mode to the encoded data, that is, add a syntax element describing the processing mode information to the encoded data. A value of a flag bit corresponding to each processing mode may be set according to a requirement. For example, when the target processing mode is the full-resolution processing mode, the corresponding Frame_Resolution_Flag may be 0, and when the target processing mode is the downsampling processing mode, the corresponding Frame_Resolution_Flag may be 1. In an embodiment, the target processing mode information is added to frame-level header information corresponding to the encoded data, for example, to a reference location of the frame-level header information. The frame-level header information is header information of the encoded data of the input video frame, sequence-level header information is header information of encoded data corresponding to a video sequence, and group-level header information is header information of encoded data corresponding to a groups of pictures. One video frame sequence may include a plurality of groups of pictures, and one groups of pictures may include a plurality of video frames. Blocks drawn by dashed lines in FIG. 5B represent frame-level header information of encoded data corresponding to input video frames. Frames respectively represent encoded data corresponding to the first, second, and $n^{th}$ video frames. In FIG. 5B, target processing modes corresponding to the first input video frame and the second input video frame are full-resolution processing modes, and the target processing mode corresponding to the third input video frame is the downsampling processing mode.

In an embodiment, the computer device may further add downsampling processing mode information of downsampling performed on the input video frame to encoded data corresponding to the input video frame, so that when obtaining the encoded data, a decoder can obtain, according to the downsampling processing information, a corresponding method for downsampling the reconstructed video frame and the downsampling proportion. The downsampling processing mode information includes one or more types of information in the downsampling method information and the downsampling proportion information. An adding location of the downsampling method information in the encoded data may be one of corresponding group-level header information, sequence-level header information, and frame-level header information. The adding location of the downsampling method information in the encoded data may be determined according to an action range corresponding to the downsampling method. An adding location of the downsampling proportion information in the encoded data may be any one of the corresponding group-level header information, sequence-level header information, and frame-level header information. The adding location of the downsampling proportion information in the encoded data may be determined according to an action range corresponding to the downsampling proportion, and the action range is a scope of application. For example, if the action range of the downsampling proportion is a group of pictures, downsampling proportion information corresponding to the groups of pictures may be added to header information corresponding to the groups of pictures. If the action range of the downsampling proportion is a video sequence, the downsampling proportion information is added to sequence-level header information corresponding to the video sequence, and this indicates that downsampling is performed on each video frame of the video sequence by using the downsampling proportion corresponding to the downsampling proportion information.

In an embodiment, the determining, from candidate processing modes, a target processing mode corresponding to the input video frame includes: obtaining a processing parameter corresponding to the input video frame, and determining the target processing mode corresponding to the input video frame according to the processing parameter; and the adding the target processing mode information corresponding to the target processing mode to the encoded data corresponding to the input video frame includes: adding the target processing mode information corresponding to the target processing mode to the encoded data corresponding to the input video frame in a case that the processing parameter cannot be reproduced in a decoding process.

For example, the processing parameter may include image encoding information corresponding to the input video frame and one or more pieces of information in image characteristic information. That the processing parameter cannot be reproduced in the decoding process refers to that the processing parameter cannot be obtained or is not generated in the decoding process. For example, if the processing parameter is information corresponding to image content of the input video frame, and image information is lost in the encoding process, a decoded video frame of the decoder differs from the input video frame. Therefore, information corresponding to image content of the input video frame is not obtained in the decoding process, that is, the information corresponding to the image content cannot be reproduced in the decoding process. A rate-distortion cost needs to be calculated in the encoding process, and the rate-distortion cost is not calculated in the decoding process. Therefore, when the processing parameter includes the rate-distortion cost, the processing parameter cannot be reproduced in the decoding process. Peak signal to noise ratio (PSNR) information of the reconstructed video frame and the input video frame obtained in the encoding process cannot be obtained in the decoding process, and therefore the PSNR information cannot be reproduced in the decoding process.

In an embodiment, when the processing parameter can be reproduced in the decoder, for example, a processing parameter such as a quantity of intra-frame code blocks or a quantity of inter-frame code blocks corresponding to the input video frame can be obtained at the decoder, that is, can be reproduced, the target processing mode information corresponding to the target processing mode may be added to the encoded data corresponding to the input video frame, or the target processing mode information corresponding to the target processing mode may not be added to the encoded data corresponding to the input video frame. When the target processing mode information corresponding to the target processing mode is added to the encoded data corresponding to the input video frame, the decoder may read the target processing mode information from the encoded data, and does not need to obtain the target processing mode according to the processing parameter. When the target processing mode information corresponding to the target processing mode is not added to the encoded data corresponding to the input video frame, the decoder determines, according to the processing parameter, a processing mode consistent with that at an encoder, to reduce a data amount of the encoded data.

Figure 6:
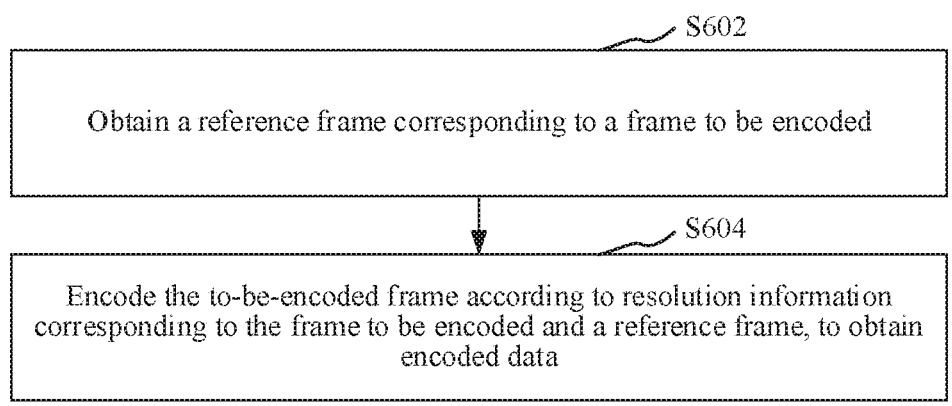
FIG. 6 is a flowchart of encoding a frame according to resolution information corresponding to the frame, to obtain encoded data corresponding to an input video frame according to an embodiment.

In an embodiment, as shown in FIG. 6, step S508, that is, encoding the frame according to resolution information corresponding to the frame, to obtain encoded data corresponding to the input video frame includes the following steps:

Step S602: Obtain a reference frame corresponding to the frame.

For example, the reference frame is a video frame that needs to be referred to when the frame is encoded, and the reference frame is a video frame obtained through reconstructing data that has been obtained through encoding before the frame. There may be one or more reference frames corresponding to the frame. For example, when the frame is a P frame, there may be one corresponding reference frame. For example, when the frame is a B frame, there may be two corresponding reference frames. A reference frame corresponding to the frame may be obtained according to a reference relationship, and the reference relationship is determined according to each video encoding and decoding standard. For example, when the second video frame in a video image group is a B frame, a corresponding reference frame may be a video frame obtained after an I frame of the groups of pictures and the fourth frame of the groups of pictures are encoded, and then decoding and reconstruction are performed on the encoded frames.

In an embodiment, the obtaining a reference frame corresponding to the frame includes: obtaining a first reference rule, the first reference rule including a size relationship between a resolution of the frame and a resolution of the reference frame; and obtaining the reference frame corresponding to the frame according to the first reference rule.

For example, the first reference rule determines the size relationship between the resolution of the frame and the resolution of the reference frame, and the size relationship between the resolutions includes that the resolution of the frame is the same as or different from the resolution of the reference frame. When the first reference rule includes that the resolution of the frame is the same as the resolution of the reference frame, the first reference rule may further include a processing mode reference rule of the resolutions of the frame and the reference frame. For example, the processing mode reference rule may include one or two of the following: a frame with a full-resolution processing mode may refer to a reference frame with a full-resolution processing mode, and a frame to be encoded with a downsampling processing mode may refer to a reference frame with a downsampling processing mode. When the first reference rule includes that the resolution of the frame is different from the resolution of the reference frame, the first reference rule may further include that the resolution of the frame is greater than or less than the resolution of the reference frame. Therefore, in an embodiment, the first reference rule may include one or more of the following: a frame to be encoded with an original resolution may refer to a reference frame with a downsampling resolution, a frame with a downsampling resolution may refer to a reference frame with an original resolution, a frame with an original resolution may refer to a reference frame with an original resolution, and a frame with a downsampling resolution may refer to a reference frame with a downsampling resolution. The frame with an original resolution refers to that the resolution of the frame is the same as the resolution of the input video frame corresponding to the frame, and the reference frame with an original resolution refers to that the resolution of the reference frame is the same as the resolution of the input video frame corresponding to the reference frame. The frame with a downsampling resolution refers to that the frame is obtained by downsampling the corresponding input video frame. The reference frame with a downsampling resolution refers to that the reference frame is obtained by downsampling the corresponding input video frame. After the first reference rule is obtained, the reference frame corresponding to the frame is obtained according to the first reference rule, so that the obtained reference frame meets the first reference rule.

In an embodiment, after step S508, that is, encoding the frame according to resolution information corresponding to the frame, to obtain encoded data corresponding to the input video frame, the method further includes: adding rule information corresponding to the first reference rule to the encoded data corresponding to the input video frame.

For example, the rule information is used to describe an adopted reference rule, and a flag bit Resolution_Referencer_Rules describing the reference rule may be added to the encoded data. A reference rule represented by a value of the flag bit may be set according to a requirement. An adding location of the rule information in the encoded data may be one or more of group-level header information, sequence-level header information, and frame-level header information. The inserting location of the rule information in the encoded data may be determined according to a scope of the first reference rule. For example, when the first reference rule is that, for a current frame with an original resolution, an encoder may use a reference frame with a downsampling resolution, the corresponding Resolution_Referencer_Rules may be 1. When the first reference rule is that, for a current frame with a downsampling resolution, an encoder may use a reference frame with a downsampling resolution, the corresponding Resolution_Referencer_Rules may be 2. If the video sequence uses the same first reference rule, the rule information may be inserted in the sequence-level header. If the first reference rule is a reference rule used by one group of pictures therein, the rule information may be inserted in the group-level header corresponding to the group of pictures that uses the first reference rule.

Step S604: Encode the frame to be encoded according to the resolution information corresponding to the frame and the reference frame, to obtain the encoded data corresponding to the input video frame.

For example, the computer device may obtain a reference frame corresponding to the frame, perform prediction according to the reference frame, to obtain a prediction residual, and perform conversion, quantization, and entropy encoding on the prediction residual, to obtain the encoded data corresponding to the input video frame. In a process of obtaining the encoded data, the computer device processes one or more of a reference frame, location information corresponding to each code block of the frame, location information corresponding to each reference block in the reference frame, and a motion vector according to the resolution of the frame. For example, after obtaining the reference frame, the computer device may obtain, from the reference frame, a reference block corresponding to a code block of the frame, and encode the code block according to the reference block. The computer device may alternatively process the reference frame according to the resolution of the frame, to obtain a corresponding target reference frame, obtain, from the target reference frame, a target reference block corresponding to the code block of the frame, and encode the code block according to the target reference block, to obtain the encoded data corresponding to the input video frame.

In an embodiment, after the encoding the frame according to resolution information corresponding to the frame, to obtain encoded data corresponding to the input video frame, the method further includes: obtaining a corresponding encoding mode during the encoding the frame; and adding encoding mode information corresponding to the encoding mode to the encoded data corresponding to the input video frame.

For example, the encoding mode is a processing mode related to encoding. For example, the encoding mode may include one or more of an upsampling mode used for a video frame obtained after decoding and reconstruction are performed on a reference frame during encoding, a rule corresponding to a reference rule, a sampling mode for sampling the reference frame, and a resolution corresponding to a motion vector. The encoding mode information corresponding to the encoding mode is added to the encoded data corresponding to the input video frame, so that the encoded data corresponding to the video frame can be decoded according to the encoding mode information during decoding.

In an embodiment, the computer device may not add the encoding mode information corresponding to the encoding mode to the encoded data. Instead, an encoding mode is set in an encoding and decoding standard, and a decoding mode corresponding to the encoding mode is set in a decoder. Alternatively, the encoder and the decoder may calculate a matching encoding mode and decoding mode according to same or corresponding algorithms. For example, the method for upsampling the reference frame when the encoding mode is set in the encoding and decoding standard is the same as the method for upsampling the reference frame during decoding.

Figure 7A:
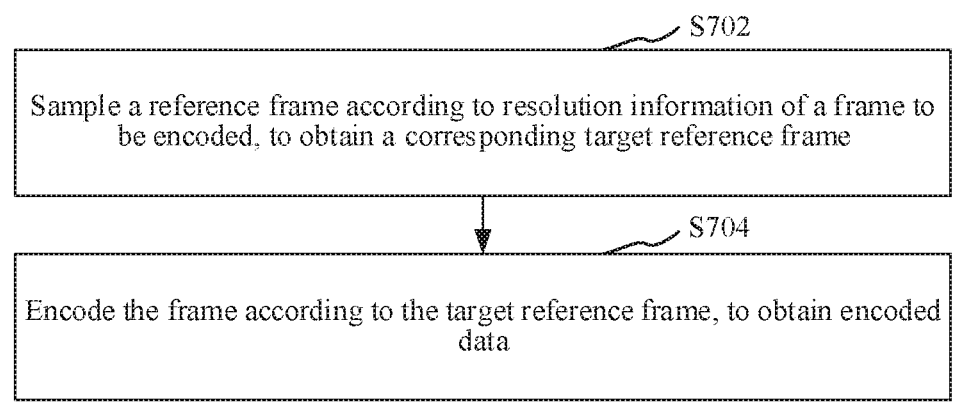
FIG. 7A is a flowchart of encoding a frame according to resolution information corresponding to the frame and a reference frame, to obtain encoded data corresponding to an input video frame according to an embodiment.

In an embodiment, as shown in FIG. 7A, step S604, that is, encoding the frame according to the resolution information corresponding to the frame and the reference frame, to obtain the encoded data corresponding to the input video frame includes the following steps:

Step S702: Sample the reference frame according to the resolution information of the frame, to obtain a corresponding target reference frame.

For example, the target reference frame is a video frame obtained after the reference frame is sampled. The sampling is a process of sampling the reference frame according to the resolution information of the frame, to make resolution information of the obtained target reference frame match. During sampling, the computer device may first determine a sampling mode, and the sampling mode includes one of a direct subpixel interpolation mode and a subpixel interpolation mode after sampling. In the direct subpixel interpolation mode, subpixel interpolation is directly performed on the reference frame, and in the subpixel interpolation mode after sampling, subpixel interpolation is performed on the reference frame after the reference frame is sampled.

Subpixel interpolation is a process of obtaining reference data of a subpixel level by performing interpolation on reference data of an integer pixel in the reference frame. For example, FIG. 7B and FIG. 7C are schematic diagrams of performing interpolation on a reference frame according to an embodiment. Referring to FIG. 7B, pixels such as A1, A2, A3, B1, B2, and B3 are 2*2 integer pixels in the reference frame, and reference data of subpixels is obtained through calculation according to the reference data of the integer pixels. For example, reference data of a subpixel a23 is calculated by averaging reference data of three integer pixels, namely, A1, A2, and A3, reference data of a subpixel a21 is calculated by averaging reference data of three integer pixels, namely, A2, B2, and C2, and then reference data of a subpixel a22 is calculated according to the reference data of the subpixels a23 and a21, to implement 1/2 pixel precision interpolation on the reference frame. Referring to FIG. 7C, pixels such as A1, A2, A3, B1, B2, and B3 are 4*4 integer pixels in the reference frame, and reference data of 15 subpixels is obtained through calculation according to the reference data of the integer pixels, to implement 1/4 pixel precision interpolation on the reference frame. For example, reference data of a subpixel a8 is obtained through calculation according to reference data of the integer pixels, that is, A2 and B2, reference data of a subpixel a2 is obtained through calculation according to reference data of the integer pixels, that is, A2 and A3, and similarly, reference data of a total of 15 subpixels, that is, a1 to a15, is obtained through calculation, to implement 1/4 pixel precision interpolation on the integer pixel A2. In a process of encoding the frame, a reference block corresponding to a code block in the frame needs to be found in the reference frame by using a motion search technology, and a motion vector is obtained through calculation according to motion information of the code block relative to the reference block, and the motion vector is encoded to notify the decoder of the location of the reference data corresponding to the reference block in the reference frame. Therefore, the target reference frame is obtained by performing subpixel interpolation on the reference frame, so that motion estimation may be performed on the frame according to a target reference frame with a higher resolution, to improve accuracy of motion estimation, and improve encoding quality.

In an embodiment, the encoder and the decoder may set, in respective encoding and decoding rules, sampling modes adopted when the target reference frame is obtained by processing the reference frame, and the adopted sampling modes are consistent. A sampling mode corresponding to processing the reference frame is determined according to configuration during encoding and decoding.

In an embodiment, after the encoding the frame according to resolution information corresponding to the frame, to obtain encoded data corresponding to the input video frame, the method further includes: adding sampling mode information corresponding to the sampling performed on the reference frame to the encoded data corresponding to the input video frame. An adding location that is of the sampling mode information corresponding to sampling the reference frame and that is in the encoded data may be any one of corresponding sequence-level header information, group-level header information, and frame-level header information. The adding location of the sampling mode information in the encoded data may be determined according to an action range corresponding to the sampling mode. The computer device may add the sampling mode information to the frame-level header information of the encoded data corresponding to the input video frame, and this indicates that when the input video frame is encoded, subpixel interpolation is performed on the corresponding reference frame in a sampling mode corresponding to the sampling mode information. For example, when a flag bit Pixel_Sourse_Interpolation used for determining the sampling mode in the frame-level header information of the encoded data is 0, it indicates that the subpixel interpolation is directly performed on the reference frame corresponding to the input video frame. When Pixel_Sourse_Interpolation is 1, it indicates that the subpixel interpolation is performed on the reference frame corresponding to the input video frame after the reference frame is sampled. The decoder may sample the reference frame in the sampling mode indicated by the flag bit in the encoded data, to obtain the target reference frame, so that the encoded data may be decoded according to the target reference frame, to obtain a reconstructed video frame.

In an embodiment, the computer device may determine a sampling ratio of the reference frame according to a proportional relationship between the resolution of the frame and the resolution of the reference frame. For example, resolutions of input video frames are all 2M*2N, and if the current input video frame is processed according to a full-resolution processing mode, that is, the current frame from the input video is directly used, the resolution of the current frame is 2M*2N. If the input video frame that can be used as a reference frame is processed according to a downsampling processing mode, to obtain that the resolution of the reference frame after downsampling is M*2N, the resolution of the corresponding reference frame obtained after reconstruction is also M*2N. Then, it is determined to perform downsampling on the reference frame in a sampling ratio of width:height=2:1 to obtain a frame with a resolution the same as that of the current frame. If the current input video frame is processed according to the downsampling processing mode, the resolution of the frame obtained after downsampling is M*N. If the input video frame that can be used as a reference frame is processed according to a full-resolution processing mode, and the resolution of the reference frame obtained after reconstruction is 2M*2N, it is determined to perform downsampling on the reference frame in a sampling ratio that a width and a height are both 1/2, to obtain a frame with a resolution the same as that of the frame.

In an embodiment, because the resolutions of input video frames are generally the same, a downsampling ratio corresponding to the frame may be obtained by downsampling the input video frame, and a downsampling ratio corresponding to the reference frame is obtained by downsampling the input video frame that can be used as a reference frame, to obtain a sampling ratio of the reference frame. For example, if the current frame is obtained by downsampling the input video frame in a sampling ratio of 1/2, and the reference frame is obtained by downsampling the input video frame that can be used as a reference frame in a sampling ratio of 1/4, a downsampling ratio corresponding to the reference frame obtained after reconstruction is performed according to the encoded data of the reference frame is also 1/4. Then, it may be determined, according to a multiple relationship between downsampling ratios of the two, to perform downsampling on the reference frame in a sampling ratio of 2:1, to obtain a frame with a resolution the same as that of the current frame.

In an embodiment, a sampling method for sampling the reference frame matches a sampling algorithm by which the input video frame is downsampled to obtain the frame. To be specific, if the reference frame needs to be downsampled, the downsampling algorithm is the same as the downsampling algorithm by which the video frame is downsampled to obtain the frame. If the reference frame needs to be upsampled, the upsampling algorithm is an opposite sampling algorithm matching the downsampling algorithm by which the input video frame is downsampled to obtain the current frame.

In this embodiment, the sampling algorithm for sampling the reference frame matches the sampling algorithm by which the video frame is downsampled to obtain the current encoded video frame, to further improve a degree of image matching between the reference frame and the current encoded video frame, thereby further improving accuracy of inter prediction, reducing a prediction residual, and improving quality of an encoded image.

Step S704: Encode the frame to be encoded according to the target reference frame, to obtain the encoded data corresponding to the input video frame.

For example, after obtaining the target reference frame, the computer device finds, from the target reference frame, an image block similar to a code block as a reference block, and calculates a pixel difference between the code block and the reference block, to obtain the prediction residual. A first motion vector is obtained according to displacement between the code block and the corresponding target reference block. The encoded data is obtained according to the first motion vector and the prediction residual.

In an embodiment, the computer device may convert the first motion vector according to target motion vector unit resolution information, to obtain a target motion vector in a target resolution, and generate the encoded data according to the target motion vector and the prediction residual. The method for converting the first motion vector according to the target motion vector unit resolution information, to obtain the target motion vector is described below.

In an embodiment, the computer device may also calculate a vector difference between the target motion vector and a corresponding predicted motion vector, and encode the vector difference, to obtain encoded data, and further reduce an amount of encoded data. A step of calculating the vector difference may include: obtaining an initial predicted motion vector corresponding to a current code block; obtaining a second vector conversion coefficient according to current motion vector unit resolution information corresponding to the initial predicted motion vector and the target motion vector unit resolution information; obtaining a target predicted motion vector corresponding to the current code block according to the initial predicted motion vector and the second vector conversion coefficient; and obtaining a motion vector difference according to the target motion vector and the target predicted motion vector. The target predicted motion vector is a motion vector in the target resolution, and a method for calculating the vector difference is described below.

In an embodiment, step S702, that is, sampling the reference frame according to the resolution information of the frame, to obtain a corresponding target reference frame includes: sampling the reference frame according to the resolution information of the frame and motion estimation pixel precision, to obtain the corresponding target reference frame.

The motion estimation pixel precision is a unit length of a motion vector corresponding to a code block in the frame. When encoding the code block in the frame, the computer device may refine a unit length of a motion vector corresponding to the code block according to the obtained motion estimation pixel precision, so that the obtained motion vector is more refined and accurate. Therefore, the reference frame needs to be sampled according to the obtained motion estimation pixel precision, to obtain the target reference frame, a first motion vector corresponding to each code block in the frame is then calculated according to the target reference frame, and encoding is performed based on the first motion vector, to obtain the encoded data corresponding to the frame.

For example, resolution information of the reference frame may be obtained, and a sampling processing method performed on the reference frame, a sampling proportion corresponding to the sampling, and pixel interpolation precision are determined according to the sampling mode used for the frame, the resolution information of the frame, the resolution information of the reference frame, and the motion estimation pixel precision corresponding to the frame. The motion estimation pixel precision may be set according to a requirement, for example, is generally 1/2 pixel precision, 1/4 pixel precision, or 1/8 pixel precision.

In an embodiment, the computer device may configure corresponding motion estimation pixel precision for the frame according to the image characteristic information of the frame, and the image characteristic information, for example, may be one or more of a size, textual information, and a motion speed of the frame. The motion estimation pixel precision corresponding to the frame may be determined by integrating a plurality of types of image characteristic information. More complex image data carried in the frame indicates more diversified image information, and higher corresponding motion estimation pixel precision. For example, when inter prediction is performed on a P frame, a motion vector corresponding to each code block in the P frame may be calculated by using relatively high motion estimation pixel precision, and when inter prediction is performed on a B frame, a motion vector corresponding to each code block in the B frame may be calculated by using relatively low motion estimation pixel precision.

In an embodiment, the sampling the reference frame according to the resolution information of the frame and motion estimation pixel precision, to obtain the corresponding target reference frame includes: calculating pixel interpolation precision according to the resolution information of the frame and the motion estimation pixel precision and directly performing subpixel interpolation on the reference frame according to the pixel interpolation precision, to obtain the corresponding target reference frame.

For example, the pixel interpolation precision is pixel precision corresponding to subpixel interpolation performed on the reference frame. When the subpixel interpolation mode is the direct subpixel interpolation mode, it indicates that subpixel interpolation may be directly performed on the reference frame, to obtain the target reference frame. Therefore, the computer device may calculate the pixel interpolation precision according to the resolution information of the frame and the motion estimation pixel precision. A ratio of the resolution information of the reference frame to the resolution information of the frame may be calculated, and the pixel interpolation precision is obtained according to the ratio and the motion estimation pixel precision.

In an embodiment, when the resolution of the reference frame is greater than the resolution of the frame, data of some subpixels in the reference frame may be directly reused, and may be used as data corresponding to subpixels corresponding to the motion estimation pixel precision. For example, the resolution of the frame is M*N, and the resolution of the reference frame is 2M*2N. If the motion estimation pixel precision is 1/2, and the pixel interpolation precision is 1, the reference frame may be directly used as the target reference frame. If the motion estimation pixel precision is 1/4, the calculated pixel interpolation precision is 1/2, and the subpixel interpolation may be performed on the reference frame by using 1/2 pixel interpolation precision, to obtain the target reference frame.

In an embodiment, when the resolution indicated by the resolution information of the frame is the same as the resolution of the reference frame, the computer device directly performs subpixel interpolation on the reference frame according to the motion estimation pixel precision, to obtain the corresponding target reference frame.

For example, when the frame is obtained by processing the input video frame by using the full-resolution processing mode and the resolution of the reference frame is also the original resolution, the resolution of the frame is the same as the resolution of the reference frame. Alternatively, when the frame is obtained by processing the input video frame by using the downsampling mode and the reference frame is also obtained by reconstructing encoded data obtained through encoding by using the downsampling mode with the same proportion, the resolution of the frame is the same as the resolution of the reference frame. Then, the computer device may directly perform subpixel interpolation on the reference frame based on the motion estimation pixel precision, to obtain the target reference frame, and the pixel interpolation precision corresponding to the subpixel interpolation is the same as the motion estimation pixel precision.

In an embodiment, the sampling the reference frame according to the resolution information of the frame and motion estimation pixel precision, to obtain the corresponding target reference frame includes: sampling the reference frame according to the resolution information of the frame, to obtain an intermediate reference frame; and performing subpixel interpolation on the intermediate reference frame according to the motion estimation pixel precision, to obtain the target reference frame.

For example, when the sampling mode corresponding to the frame is the subpixel interpolation mode after sampling, it indicates that the reference frame first needs to be sampled, to obtain the intermediate reference frame with a resolution the same as that of the frame, and then subpixel interpolation is performed on the intermediate reference frame, to obtain the corresponding target reference frame.

When the resolution indicated by the resolution information of the frame is less than the resolution of the reference frame, the reference frame is downsampled according to the resolution information of the frame, to obtain the intermediate reference frame; and subpixel interpolation is performed on the intermediate reference frame according to the motion estimation pixel precision corresponding to the frame, to obtain the target reference frame. For example, if an input video frame with a resolution of 2M*2N is downsampled according to a downsampling processing mode, to obtain a frame with a resolution of M*N, and the resolution of the reference frame is 2M*2N (the full-resolution processing mode), the reference frame is downsampled according to a sampling proportion of 1/2, to obtain an intermediate reference frame with a resolution of M*N. If the motion estimation pixel precision corresponding to the obtained frame is 1/2, subpixel interpolation is then performed on the intermediate reference frame according to pixel interpolation precision the same as the motion estimation pixel precision, that is, the 1/2 subpixel interpolation precision, to obtain the target reference frame. If the motion estimation pixel precision corresponding to the obtained frame is 1/4, subpixel interpolation is performed on the intermediate reference frame according to the 1/4 subpixel interpolation precision, to obtain the target reference frame.

When the resolution indicated by the resolution information of the frame is greater than the resolution of the reference frame, the reference frame is upsampled according to the resolution information of the frame, to obtain the intermediate reference frame; and subpixel interpolation is performed on the intermediate reference frame according to the motion estimation pixel precision corresponding to the frame, to obtain the target reference frame. For example, if the resolution of the frame is 2M*2N, and the resolution of the reference frame is 1/2M*1/2N, the reference frame needs to be upsampled according to a sampling proportion of 4, to obtain an intermediate reference frame with a resolution the same as that of the frame. If the motion estimation pixel precision is 1/2, subpixel interpolation continues to be performed on the obtained intermediate reference frame according to 1/2 pixel interpolation precision, to obtain the target reference frame. If the motion estimation pixel precision is 1/4, subpixel interpolation continues to be performed on the obtained intermediate reference frame according to 1/4 pixel interpolation precision, to obtain the target reference frame.

As shown in FIG. 8A, step S604, that is, encoding the frame according to the resolution information corresponding to the frame and the reference frame, to obtain the encoded data corresponding to the input video frame includes the following steps:

Step S802: Determine a first vector conversion parameter according to the resolution information of the frame and first resolution information, the first resolution information including resolution information of the reference frame or target motion vector unit resolution information corresponding to the input video frame.

For example, the first vector conversion parameter is used for converting location information of an obtained motion vector or the motion vector. The resolution information is information related to a resolution, for example, may be the resolution or a downsampling proportion. The first vector conversion parameter may be a ratio of the resolution information of the frame to the first resolution information. For example, assuming that the downsampling proportion of the reference frame is 1/3, and the downsampling proportion of the frame is 1/6, the first vector conversion parameter may be obtained by dividing 1/3 by 1/6, that is, 2.

Step S804: Obtain a target motion vector corresponding to each code block in the frame according to the first vector conversion parameter.

For example, after obtaining the first vector conversion parameter, the computer device converts the obtained motion vector or the location information corresponding to the motion vector according to the first vector conversion parameter, to obtain the target motion vector. When the target motion vector is converted by using the first vector conversion parameter, the target motion vector is a motion vector in a target resolution indicated by the target motion vector unit resolution information. The target motion vector unit resolution information is information corresponding to a target resolution corresponding to a unit of the target motion vector, and for example, may be the target resolution or a downsampling proportion. When the location information corresponding to the motion vector is converted by using the first vector conversion parameter, the location information corresponding to the frame and the location information of the reference frame are in a same quantization scale, a second motion vector is obtained according to converted location information, and the second motion vector is converted into the target motion vector in the target resolution.

In an embodiment, step S802, that is, determining a first vector conversion parameter according to the resolution information of the frame and first resolution information includes determining the first vector conversion parameter according to the resolution information of the frame and the resolution information of the reference frame. Step S804, that is, the obtaining a target motion vector corresponding to each code block in the frame according to the first vector conversion parameter includes: obtaining first location information corresponding to a current code block, and obtaining second location information corresponding to a target reference block corresponding to the current code block; and calculating a target motion vector corresponding to the current code block according to the first vector conversion parameter, the first location information, and the second location information.

For example, the current code block is a code block on which predictive encoding currently needs to be performed in the input video frame. The target reference block is an image block used for performing predictive encoding on the current code block in the reference frame. The first location information corresponding to the current code block may be represented by a coordinate of a pixel. The first location information corresponding to the current code block may include coordinates corresponding to all pixels of the current code block, and the first location information corresponding to the current code block may alternatively include coordinates of one or more pixels of the current code block. The second location information corresponding to the target reference block may include coordinates corresponding to all pixels of the target reference block, and the second location information corresponding to the target reference block may alternatively include coordinates of one or more pixels of the target reference block. For example, a coordinate of the first pixel of the current image block may be used as a coordinate value of the current code block, and a coordinate of the first pixel of the target reference block may be used as a coordinate value of the target reference block.

In an embodiment, the computer device may convert the first location information by using the first vector conversion parameter, to obtain corresponding first converted location information, and obtain the target motion vector according to a difference between the first converted location information and the second location information. Alternatively, the computer device may convert the second location information by using the first vector conversion parameter, to obtain corresponding second converted location information, and obtain the target motion vector according to a difference between the first location information and the second converted location information.

In an embodiment, the first vector conversion parameter is a proportion obtained by dividing large resolution information by small resolution information in the resolution information of the frame and the resolution information of the reference frame, where a resolution corresponding to the large resolution information is greater than a resolution corresponding to the small resolution information. The first vector conversion parameter is used for converting location information of a frame of the small resolution information in the frame and the reference frame. For example, if the resolution of the frame is 1200*1200 pixels and the resolution of the reference frame is 600*600 pixels, the large resolution is 1200*1200 pixels, and the small resolution is 600%00 pixels. The first vector conversion parameter may be 2. Assuming that the first location information is (6, 8), and the second location information is (3, 3), the target motion vector is (6, 8)−(3*2, 3*2)=(0, 2), In this embodiment of this application, the location information corresponding to the frame of the small resolution information is converted, so that a value of the target motion vector may be reduced, and a data amount of the encoded data is reduced.

In an embodiment, the first vector conversion parameter is a proportion obtained by dividing small resolution information by large resolution information in the resolution information of the frame and the resolution information of the reference frame, where the first vector conversion parameter is used for converting location information of a frame of the large resolution information in the frame and the reference frame. For example, assuming that a resolution of the frame is 1200*1200 pixels, and a resolution of the reference frame is 600*600 pixels, the first vector conversion parameter may be 1/2. Assuming that the first location information is (6, 8), and the second location information is (3, 3), the target motion vector is (6*1/2, 8*1/2)−(3, 3)=(0, 1).

Figure 8B:
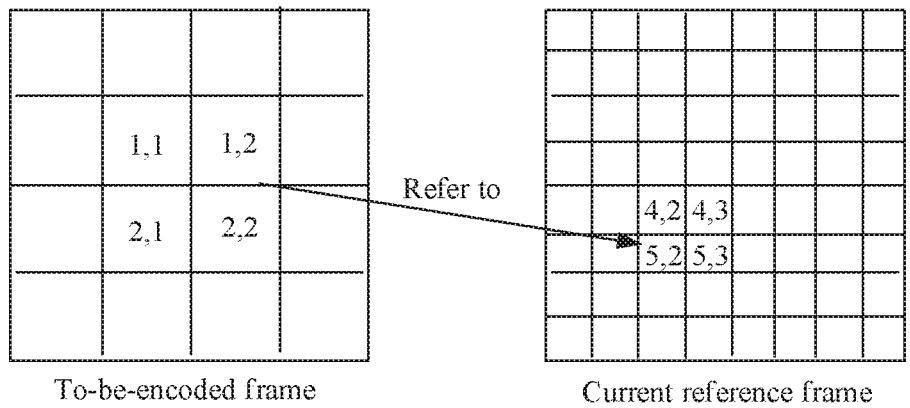
FIG. 8B is a schematic diagram of a reference frame and a frame according to an embodiment.

In this embodiment of this application, the location information is converted by using the first vector conversion parameter, so that obtained location information is in a same quantization scale, a value of the target motion vector may be reduced, and a data amount of the encoded data is reduced. For example, as shown in FIG. 8B, the resolution of the reference frame is twice that of the frame, the current code block is formed by pixels (1, 1), (1, 2), (2, 1), and (2, 2), and the corresponding target reference block is formed by pixels (4, 2), (4, 3), (5, 2), and (5, 3). If conversion is not performed, the target motion vector is (−3, −1). If corresponding location information in the frame is multiplied by 2 during calculation of the target motion vector, and then the target motion vector is calculated, the target motion vector is (−2, 0), less than (−3, −1).

In an embodiment, step S802, that is, determining a first vector conversion parameter according to the resolution information of the frame and first resolution information includes: obtaining the target motion vector unit resolution information; and determining the first vector conversion parameter according to the resolution information of the frame and the target motion vector unit resolution information. Step S804, that is, obtaining a target motion vector corresponding to each code block in the frame according to the first vector conversion parameter includes: obtaining a first motion vector according to displacement between the current code block and the corresponding target reference block; and obtaining the target motion vector corresponding to the current code block according to the first vector conversion parameter and the first motion vector.

For example, the target motion vector unit resolution information is information corresponding to a target resolution corresponding to a unit of the target motion vector, and for example, may be the target resolution or a corresponding downsampling proportion. The target motion vector is calculated by using a vector unit in the resolution as a standard. Some of frames corresponding to the input video sequence may have resolutions the same as the original resolution of the input video frame, and resolutions of some other frames to be encoded are less than the original resolution of the input video frame, that is, different frames to be encoded in the video sequence have different resolutions. Therefore, a resolution corresponding to a unit of the target motion vector needs to be determined. The resolution corresponding to the unit of the target motion vector may be set before encoding or obtained according to a parameter of an encoding process, and may be set according to a requirement.

The first motion vector is obtained according to displacement between the current code block and the corresponding target reference block, and the target reference block may be obtained from the reference frame, or from the target reference frame obtained by processing the reference frame. After the first motion vector is obtained, the first vector conversion parameter may be multiplied with the first motion vector, and the obtained product is used as the target motion vector. For example, it is assumed that the resolution corresponding to the target motion vector unit is the original resolution, and the downsampling proportion corresponding to the frame to be encoded is 1/2, the target motion vector unit is the original resolution, and the first motion vector is calculated in the resolution of the frame to be encoded. Therefore, the first motion vector needs to be converted. The first vector conversion parameter is equal to 2, and when the obtained first motion vector is (2, 2), the target motion vector is (4, 4). After obtaining the target motion vector, the computer device may perform encoding according to the target motion vector, for example, may encode the target motion vector and the prediction residual corresponding to the current code block, to obtain the encoded data.

In an embodiment, when the target reference block is obtained from the reference frame, it may be understood that for the same code block, the first motion vector may be equal to the second motion vector.

In an embodiment, the resolution corresponding to the unit of the target motion vector may be the resolution corresponding to the input video frame, that is, the original resolution, or the resolution corresponding to the unit of the target motion vector may be the resolution corresponding to the frame. The first vector conversion parameter may be a ratio of the resolution information corresponding to the target motion vector unit to the resolution information of the frame. For example, it is assumed that the resolution corresponding to the target motion vector unit is the original resolution, the sampling proportion corresponding to the target motion vector unit is 1, and the sampling proportion of the resolution of the frame is 1/2, the first vector conversion parameter may be obtained by dividing 1 by 1/2, that is, 2. Alternatively, it is assumed that the resolution corresponding to the target motion vector unit is the original resolution, that is, 900*900 pixels, the resolution of the frame is 450*600 pixels, and there may be two first vector conversion parameters, that is, a first vector conversion parameter in a horizontal direction and a first vector conversion parameter in a vertical direction. Then, the first vector conversion parameter in the horizontal direction is 900/450=2, and the first vector conversion parameter in the vertical direction is 900/600=1.5.

In an embodiment, the target motion vector unit resolution information may be obtained according to a calculation capability of a device performing encoding. For example, when the device performing encoding can perform calculation only on integers or spends long time in calculation when a value is a decimal, the resolution corresponding to the target motion vector unit may be the original resolution corresponding to the input video frame. When the device performing encoding can quickly compute decimals, the resolution corresponding to the target motion vector unit may be the resolution corresponding to the frame.

In an embodiment, when the resolution information of the frame is consistent with the target motion vector unit resolution information, the first vector conversion parameter is 1, and the first motion vector is the same as the target motion vector. Therefore, step S802 may be skipped, and the first motion vector is used as the target motion vector. When the resolution information of the frame is inconsistent with the target motion vector unit resolution information, step S802 is performed.

In this embodiment of this application, when the resolution corresponding to the unit of the target motion vector is the resolution corresponding to the input video frame, that is, the original resolution, for a video sequence with consistent resolutions, target resolutions corresponding to the input video frames are consistent, so that consistency of the target motion vector can be kept. When the resolution corresponding to the unit of the target motion vector is the resolution corresponding to the video frame, because the resolution information of the frame is consistent with the target motion vector unit resolution information, the first motion vector does not need to be converted, so that calculation time can be reduced.

In an embodiment, identification information indicating the target motion vector unit resolution information may be added to the encoded data, so that the decoder may obtain the target resolution corresponding to the target motion vector. If the identification information is not carded, the encoder and the decoder may agree on the target resolution corresponding to the target motion vector. The identification information is used for indicating the resolution information corresponding to the target motion vector. An adding location of the identification information in the encoded data may be one or more of group-level header information, sequence-level header information, frame-level header information, and block-level header information. The block-level header information is header information of encoded data corresponding to the code block. The adding location of the identification information in the encoded data may be determined according to an action range of the target motion vector unit resolution information. For example, if resolutions corresponding to the vector units in the video sequence are consistent, the adding location may be the sequence-level header information. Resolution information represented by a value of a flag bit may be set according to a requirement. For example, when the resolution corresponding to the target motion vector unit resolution information is the original resolution, the corresponding flag bit MV_Scale_Adaptive is 0. When the resolution corresponding to the target motion vector unit resolution information is the resolution corresponding to the frame, the corresponding flag bit MV_Scale_Adaptive is 1.

Figure 9:
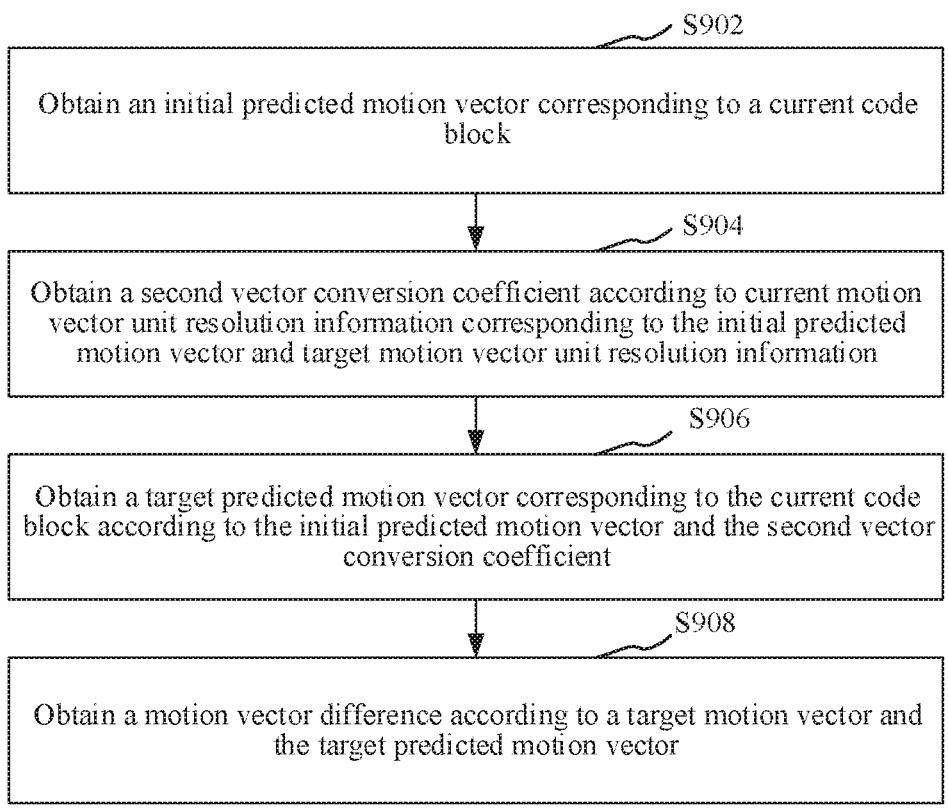
FIG. 9 is a flowchart of encoding a frame according to resolution information corresponding to the frame and a reference frame, to obtain encoded data corresponding to an input video frame according to an embodiment.

In an embodiment, as shown in FIG. 9, the encoding the frame according to the resolution information corresponding to the frame and the reference frame, to obtain the encoded data corresponding to the input video frame includes the following steps:

Step S902: Obtain an initial predicted motion vector corresponding to a current code block.

For example, a motion vector of the current code block may be predicted, to obtain a predicted value, a difference between the target motion vector and the predicted value is calculated, to obtain a motion vector difference, and the motion vector difference is encoded, to reduce a quantity of bits for the encoded data. The initial predicted motion vector is used for predicting the motion vector of the current code block. There may be one or more initial predicted motion vectors, and this may be set according to a requirement. A rule for obtaining the initial predicted motion vector may be set according to a requirement. Because the current code block usually has spatial correlation with a code block adjacent thereto, a target motion vector value corresponding to one or more adjacent encoded blocks corresponding to the current code block may be used as the initial predicted motion vector. For example, the first motion vector value corresponding to adjacent encoded blocks in the upper right corner and the upper left corner of the current code block may be used as the initial predicted motion vector. Alternatively, a motion vector value of the target reference block corresponding to the target reference block corresponding to the current code block may be used as the initial predicted motion vector.

Step S904: Obtain a second vector conversion coefficient according to current motion vector unit resolution information corresponding to the initial predicted motion vector and the target motion vector unit resolution information.

For example, the current motion vector unit resolution information is information corresponding to the current resolution corresponding to a unit of the initial predicted motion vector, and for example, may be a current resolution or a downsampling proportion. The resolution corresponding to the unit of the initial predicted motion vector means that the unit of the initial predicted motion vector is calculated by using a vector unit in the current resolution as a standard, that is, the motion vector in the current resolution. When the current motion vector unit resolution information corresponding to the initial predicted motion vector is different from the target motion vector unit resolution information, a second vector conversion coefficient needs to be obtained according to the current motion vector unit resolution information corresponding to the initial predicted motion vector and the target motion vector unit resolution information. The second vector conversion parameter is used for converting the initial predicted motion vector into a motion vector in the target resolution, and may be a ratio of the resolution information corresponding to the target motion vector unit to the current motion vector unit resolution information. For example, assuming that the resolution corresponding to the target motion vector unit is 200*200 pixels, and the current motion vector unit resolution information is 100*100 pixels, the second vector conversion parameter may be 2.

Step S906: Obtain a target predicted motion vector corresponding to the current code block according to the initial predicted motion vector and the second vector conversion coefficient.

For example, after the second vector conversion parameter is obtained, the target predicted motion vector is obtained by performing calculation according to the initial predicted motion vector and the second vector conversion coefficient, where the target predicted motion vector is a predicted motion vector in the target resolution. For example, when there is one initial predicted motion vector, a product between the initial predicted motion vector and the second vector conversion coefficient may be used as the target predicted motion vector. When there are a plurality of initial predicted motion vectors, the initial predicted motion vectors are computed, to obtain a calculation result, and the target motion vector is obtained according to the calculation result and the second vector conversion coefficient. The calculation result may be one or more of a minimum value, an average value, and an intermediate value in the initial predicted motion vectors. It may be understood that, an algorithm for obtaining the target predicted motion vector according to the initial predicted motion vector and the second vector conversion coefficient may be user-defined, and the same target predicted motion vector may be calculated by using a consistent user-defined algorithm at the decoder.

Step S908: Obtain a motion vector difference according to a target motion vector and the target predicted motion vector.

For example, the difference between the target motion vector and the target predicted motion vector is used as the motion vector difference, to perform encoding according to the motion vector difference, to obtain the encoded data, and reduce a data amount of the encoded data.

In this embodiment of this application, the initial predicted motion vector is converted, to obtain the target predicted motion vector in the target resolution, so that units of the target predicted motion vector and the target motion vector are in a matching quantization scale. Therefore, the obtained motion vector difference is small, and the data amount of the encoded data is reduced.

In an embodiment, step S504, that is, determining, from candidate processing modes, a target processing mode corresponding to the input video frame includes: calculating a proportion of a target predicted type code block in a forward encoded video frame corresponding to the input video frame; and determining the target processing mode corresponding to the input video frame according to the proportion.

For example, the predicted type code block is a code block corresponding to a frame predicted type. The proportion of the target predicted type code block may be one or two in a proportion corresponding to an intra-frame code block and a proportion corresponding to an inter-frame code block. The proportion of the target predicted type code block in the forward encoded video frame corresponding to the input video frame may be a ratio of the target predicted type code block to another predicted type code block, or a ratio of a quantity of code blocks of this type to a total quantity of code blocks. This may be set according to a requirement. For example, a first quantity of intra-frame code blocks in the forward encoded video frame and a second quantity of inter-frame code blocks in the forward encoded video frame may be obtained. A ratio of the intra-frame code block to the inter-frame code block is calculated according to the first quantity and the second quantity, or a third quantity of all code blocks in the forward encoded video frame is counted, to obtain a ratio of the quantity of the intra-frame code block to the third quantity according to the first quantity and the third quantity. A ratio of the quantity of the inter-frame code block to the third quantity may also be calculated according to the second quantity and the third quantity.

The forward encoded video frame is a video frame that has been encoded before the input video frame is encoded, and a specific quantity of the obtained forward encoded video frames may be user-defined. For example, the forward encoded video frame may be one encoded video frame that has been encoded previous to the input video frame, or three encoded video frames that have been encoded previous to the input video frame. After the corresponding proportion of the target predicted type code block in the forward encoded video frame is calculated, the target processing mode corresponding to the input video frame is determined according to the calculated proportion. When there are a plurality of obtained forward encoded video frames, corresponding proportions of code blocks of different types in each forward encoded video frame may be calculated, and a total proportion is obtained through weighted calculation according to the proportions, and the target processing mode corresponding to the input video frame is then determined according to the total proportion and a preset threshold. The weight corresponding to the forward encoded video frame may be in a negative association with an encoding distance between the forward encoded video frame and the input video frame.

In an embodiment, a proportion of the intra-frame code block of the forward encoded video frame in the forward encoded video frame may be calculated, and when the proportion is greater than a target threshold, the processing mode is determined as the downsampling processing mode.

For the proportion corresponding to the intra-frame code block, when the proportion is greater than the target threshold, the target processing mode corresponding to the input video frame may be determined as the downsampling processing mode, and otherwise, the target processing mode corresponding to the video frame is determined as the full-resolution processing mode. For example, when the proportion is greater than the target threshold, the target processing mode corresponding to the input video frame is determined as the downsampling processing mode, and otherwise, the target processing mode corresponding to the video frame is determined as the full-resolution processing mode.

In this embodiment, a larger proportion of the intra-frame code block indicates higher complexity of the video or lower correlation between video frames. Therefore, the obtained prediction residual is relatively large, and therefore, the downsampling processing mode is more inclined to be used for encoding, to reduce the amount of the encoded data.

The target threshold may be determined according to a processing mode of the reference frame corresponding to the input video frame. When the processing mode of the reference frame corresponding to the input video frame is the downsampling mode, a first reference threshold T1 is obtained, and the first reference threshold T1 is used as a target threshold. Similarly, when the processing mode of the reference frame corresponding to the input video frame is the full-resolution processing mode, a second reference threshold T2 is obtained, and the second reference threshold T2 is used as a target threshold. Further, after the target threshold is obtained according to the resolution information of the reference frame corresponding to the input video frame, the processing mode of the input video frame is determined according to the target threshold and the proportion of the intra-frame code block of the forward encoded video frame in the forward encoded video frame. When the proportion of the intra-frame code block of the forward encoded video frame in the forward encoded video frame is greater than the target threshold, the target determining mode corresponding to the input video frame is determined as the downsampling processing mode.

In an embodiment, the second reference threshold is greater than the first reference threshold, so that when the target processing mode corresponding to the reference frame is the full-resolution processing mode, the full-resolution processing mode is more inclined to be used for the input video frame, and when the target processing mode corresponding to the reference frame is the downsampling processing mode, the downsampling processing mode is more inclined to be used for the input video frame.

Figure 10:
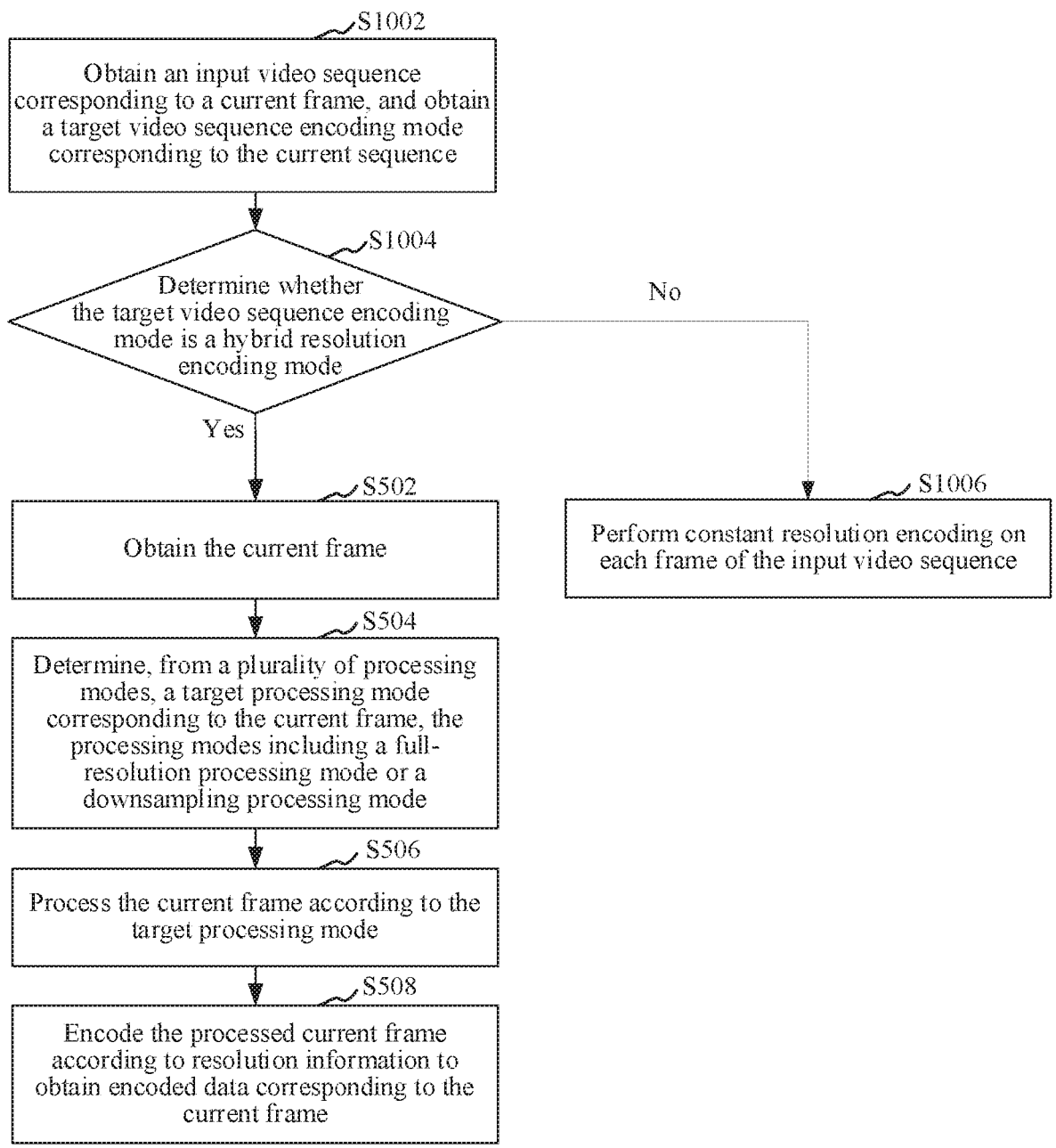
FIG. 10 is a flowchart of a video encoding method according to an embodiment.

In an embodiment, as shown in FIG. 10, before the obtaining an input video frame, the video encoding method further includes the following steps:

Step S1002: Obtain an input video sequence corresponding to the input video frame, and obtain a target video sequence encoding mode corresponding to the input video sequence, the target video sequence encoding mode including a constant resolution encoding mode or a hybrid resolution encoding mode.

For example, the input video sequence may include a plurality of input video frames. When the target video sequence encoding mode is the constant resolution encoding mode, each input video frame of the input video sequence is encoded in the same resolution, such as a full resolution. When the target video sequence encoding mode is the hybrid resolution encoding mode, the computer device obtains the target processing mode corresponding to each input video frame, and processes the input video frame according to the target processing mode, to obtain a frame. When the frame is encoded, a resolution of the frame may be the same as the resolution of the input video frame, or less than the resolution of the input video frame. Therefore, in the input video sequence, the frames have different resolutions.

In an embodiment, the obtaining a target video sequence encoding mode corresponding to the input video sequence includes: obtaining current environmental information, the current environmental information including at least one of current encoding environmental information and current decoding environmental information; and determining the target video sequence encoding mode corresponding to the input video sequence according to the current environmental information.

For example, the environmental information may include one or more of a processing capability of a device performing the video encoding method, a processing capability of a device performing a video decoding method, and current application scenario information. The processing capability may be indicated by a processing speed. For example, for a device having a strong processing capability, because the processing speed is high, the corresponding target video sequence encoding mode is the full-resolution encoding mode. When the current application scenario corresponding to the current application scenario information is a real-time application scenario, the video sequence encoding mode is the hybrid resolution encoding mode. When the current application scenario corresponding to the current application scenario information is a non-real-time application scenario, the video sequence encoding mode is the constant resolution encoding mode. A correspondence between the current environmental information and the video sequence encoding mode may be set. When the current environmental information is obtained, the target video sequence encoding mode corresponding to the input video sequence is obtained according to the correspondence between the current environmental information and the video sequence encoding mode. For example, a correspondence between an average value of a processing speed of the device performing the video encoding method and a processing speed of the device performing the video decoding method and the video sequence encoding mode may be set. After the processing speed of the device performing the video encoding method and the processing speed of the device performing the video decoding method are obtained, the average value is calculated, and the target video sequence encoding mode is obtained according to the average value. Whether the current application scenario is a real-time application scenario may be set according to a requirement. For example, a video call application scenario and a game application scenario are real-time application scenarios, and application scenarios corresponding to video encoding on a video website and encoding of an offline video may be non-real-time application scenarios.

Step S1004: Determine whether the target video sequence encoding mode is the hybrid resolution encoding mode.

If yes, step S502 is performed, and otherwise, step S1006 is performed.

Step S1006: Perform constant resolution encoding on each input video frame of the input video sequence.

For example, when the video sequence encoding mode is the constant resolution encoding mode, the computer device performs constant resolution encoding on each input video frame of the input video sequence.

In an embodiment, the encoding the frame according to resolution information corresponding to the frame, to obtain encoded data corresponding to the input video frame includes: adding target video sequence encoding mode information corresponding to the target video sequence encoding mode to the encoded data.

For example, the target video sequence encoding mode information is used for describing an encoding mode used for the input video sequence, and a flag bit Sequence_Mix_Resolution_Flag describing the video sequence encoding mode may be added to the encoded data, and a value of the flag bit may be set according to a requirement. An adding location of the video sequence encoding mode information in the encoded data may be the sequence-level header information. For example, when Sequence_Mix_Resolution_Flag is 1, the corresponding target video sequence encoding mode may be the hybrid resolution encoding mode. When Sequence_Mix_Resolution_Flag is 0, the corresponding target video sequence encoding mode may be the constant resolution encoding mode.

Figure 11:
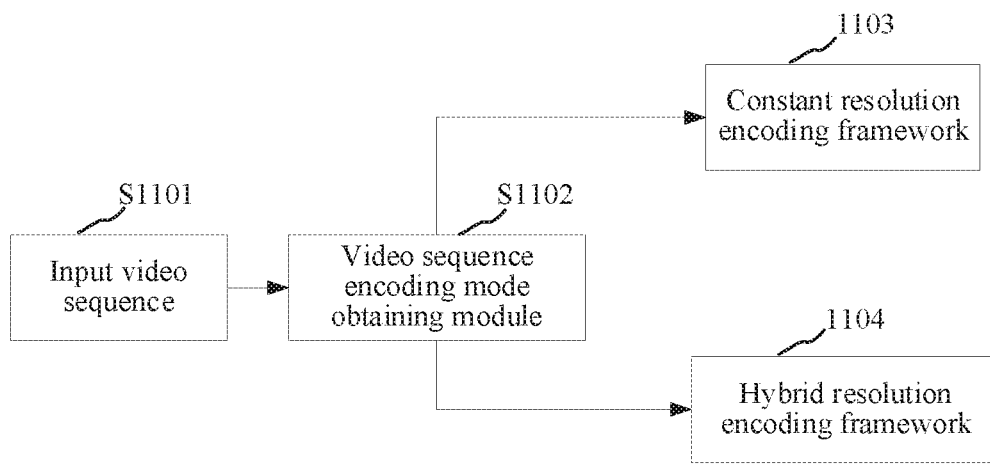
FIG. 11 is a schematic diagram of a video encoding framework according to an embodiment.

In an embodiment, a video encoding framework is shown in FIG. 11. The video encoding framework includes a constant resolution encoding framework (1103) and a hybrid resolution encoding framework (1104), and the hybrid resolution encoding framework may correspond to the encoding framework in FIG. 2. After the input video sequence is obtained (S1101), the video sequence encoding mode is decided at a video sequence encoding mode obtaining module (S1102). When the target video sequence encoding mode is the hybrid resolution encoding mode, encoding is performed by using the hybrid resolution encoding framework. When the target video sequence encoding mode is the constant resolution encoding mode, constant resolution encoding is performed by using the constant resolution encoding framework in FIG. 11. The constant resolution encoding framework may be a current high efficiency video coding (HEVC) encoding framework, an H.265 encoding framework, or the like.

The video encoding method is described below by using an assumption that a video sequence A includes three input video frames: a, b, and c.

1. A target video sequence encoding mode corresponding to the video sequence A is obtained. Because a current environment is a video call environment, the target video sequence encoding mode is a hybrid resolution encoding mode.

2. The first input video frame a is decided by using a processing decision unit in re hybrid resolution encoding framework, to obtain that the target processing mode is the downsampling mode, and the downsampling proportion is 1/2, a is downsampled, to obtain a video frame a1 obtained after downsampling, and intra-frame encoding is performed on a1, to obtain encoded data d1 corresponding to a1, and the encoded data corresponding to a1 is reconstructed, to obtain a corresponding reconstructed video frame a2.

3. The second input video frame b is decided by using the processing decision unit in the hybrid resolution encoding framework, to obtain that the target processing mode is the downsampling mode, and the sampling proportion is 1/4. b is downsampled to obtain b1, and b1 is encoded to obtain encoded data corresponding to b, and sampling proportion information corresponding to the downsampling proportion and target processing mode information corresponding to the target processing mode are carried in the encoded data.

The encoding process includes: because b is an inter predicted frame, a2 needs to be used as a reference frame; and because the resolution of b1 is different from that of a2, a2 needs to be sampled. The sampling mode of a2 is determined as direct subpixel interpolation, and the motion estimation precision is 1/4, and therefore the pixel interpolation precision is 1/4*2=1/2. 1/2 subpixel interpolation is performed on a2 according to the pixel interpolation precision, to obtain a target reference frame a3. A first motion vector MV1 is calculated according to displacement between the current code block in b1 and the target reference block in the target reference frame, and a prediction residual is p1 It is obtained that the target resolution is the original resolution, and therefore, the target motion vector is 4MV1. It is obtained through calculation that an initial predicted vector is MV2, and the initial predicted vector is calculated in a resolution corresponding to the 1/4 downsampling proportion. Therefore, the target predicted vector is 4MV2, and therefore, a motion vector difference MVD1 corresponding to the current code block is 4MV1−4MV2, Conversion, quantization, and entropy encoding are performed on MVD1 and p1, to obtain the encoded data.

4. The third input video frame c is decided by using the processing decision unit in the hybrid resolution encoding framework, to obtain that the processing mode is the downsampling mode, and the sampling proportion is 1/8. c is downsampled, to obtain c1, and c1 is encoded, to obtain encoded data d2 corresponding to c.

The encoding process includes: because c is an inter predicted frame, the corresponding reference frame is a reconstructed video frame b2 obtained by reconstructing the encoded data of b; and because the resolution of c1 is different from that of b2, b2 needs to be sampled. The sampling mode of b2 is determined as direct subpixel interpolation, and the motion estimation precision is 1/4, and therefore the pixel interpolation precision is 1/4*2=1/2. 1/2 subpixel interpolation is performed on b2 according to the pixel interpolation precision, to obtain a target reference frame b3. A first motion vector MV3 is calculated according to displacement between the current code block in c1 and the target reference block in the target reference frame, and a prediction residual is p2. It is obtained that the target resolution is the original resolution, and therefore, the target motion vector is 8MV3. It is obtained that an initial predicted vector is MV4, and the initial predicted vector is calculated in a resolution corresponding to the 1/4 downsampling proportion. Therefore, the target predicted vector is 4MV4, and therefore, a motion vector difference MVD2 corresponding to the current code block is 8MV3−4MV4. Conversion, quantization, and entropy encoding are performed on MVD2 and p2, to obtain encoded data d3.

5. d1, d2, and d3 are formed into an encoded data packet, which is sent to a receiving terminal as encoded data corresponding to the video sequence. The encoded data corresponding to the video sequence carries a flag bit describing that the target video sequence encoding mode is the hybrid resolution encoding mode.

Figure 12:
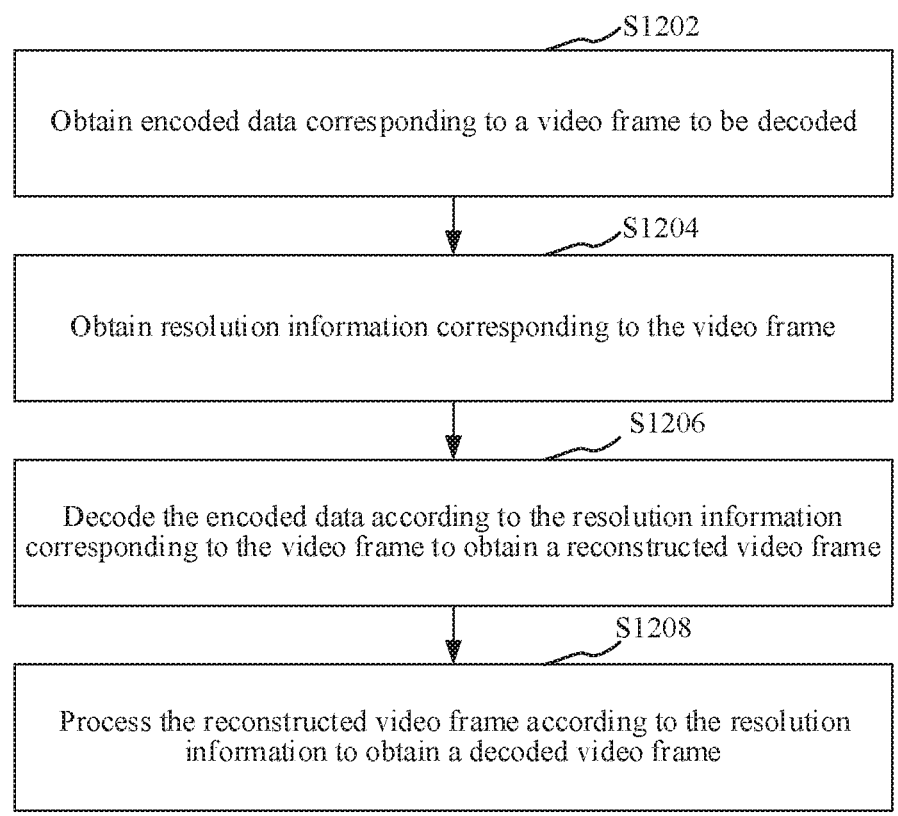
FIG. 12 is a flowchart of a video decoding method according to an embodiment.

As shown in FIG. 12, in an embodiment, a video decoding method is provided. In this embodiment, applying the method to the terminal 110 or the server 120 in the foregoing FIG. 1 is mainly used as an example for description. The method may include the following steps:

Step S1202: Obtain encoded data corresponding to a video frame to be decoded.

For example, the video frame is a video frame that needs to be decoded. One video sequence may include a plurality of video frames to be decoded. The video frame may be a video frame obtained in real time, or a video frame obtained in a pre-stored video sequence.

Step S1204: Obtain resolution information corresponding to the video frame.

For example, the resolution information is information related to a resolution, for example, may be the resolution or a downsampling proportion. The resolution information corresponding to the video frame may be carried in the encoded data, or obtained through calculation by a computer device.

In an embodiment, the encoded data may carry the resolution information corresponding to the video frame, for example, may carry a resolution or a downsampling proportion corresponding to the video frame.

In an embodiment, the encoded data may carry processing mode information, and the computer device obtains the processing mode information from the encoded data, and obtains the resolution information corresponding to the video frame according to the target processing mode information. For example, a target processing mode corresponding to the processing mode information that may be carried in the encoded data is a downsampling processing mode, and it is determined in an encoding standard and a decoding standard that downsampling proportions are both 1/2, or the corresponding downsampling proportion is carried in the encoded data, and the obtained resolution information is that the downsampling proportion is 1/2.

Step S1206: Decode the encoded data according to the resolution information corresponding to the video frame, to obtain a reconstructed video frame corresponding to the video frame.

For example, the reconstructed video frame is a video frame obtained through decoding and reconstruction. It may be understood that, resolution information corresponding to the reconstructed video frame corresponds to resolution information of a frame in an encoding process. If image information is not lost in the encoding process, the reconstructed video frame is the same as the frame. If image information is lost in the encoding process, a difference between the reconstructed video frame and the frame corresponds to a loss value. The computer device decodes the encoded data at the resolution information corresponding to the video frame. Decoding may include at least one of prediction, inverse conversion, dequantization, and entropy decoding, and may be determined according to an encoding process. During decoding, the computer device processes one or more of a reference frame, location information corresponding to each block of the video frame, location information corresponding to each reference block in the reference frame, and a motion vector according to the resolution information of the video frame. The processing method matches a processing method used by an encoder for encoding. For example, the computer device may obtain the reference frame corresponding to the video frame, and process the reference frame according to the resolution information corresponding to the video frame, to obtain a target reference frame. The target reference block is obtained according to carried motion vector information, a predicted value corresponding to the block is obtained according to the target reference block, and the reconstructed video frame is obtained according to a prediction residual in the encoded data and the predicted value.

In an embodiment, when an encoder converts location information, when obtaining the corresponding location information in a decoding process, the computer device needs to correspondingly convert the location information, to keep consistency between the target reference blocks obtained by the encoder and the decoder.

In an embodiment, when the motion vector information carried in the encoded data is a target motion vector, the computer device may convert the target motion vector according to target motion vector unit resolution information and the resolution information corresponding to the video frame, to obtain a first motion vector in the resolution information corresponding to the video frame, and obtain a target reference block corresponding to the block according to the first motion vector.

In an embodiment, when the motion vector information carried in the encoded data is a motion vector difference, the computer device obtains an initial predicted motion vector corresponding to a current block, processes a motion vector difference corresponding to each block and the initial predicted motion vector in the same resolution, to obtain a first motion vector that corresponds to a corresponding block and that is in a resolution of the video frame, and obtain a target reference block corresponding to the block according to the first motion vector.

For example, the computer device converts both the motion vector difference and the initial predicted motion vector into motion vectors corresponding to the same resolution. For example, the initial predicted motion vector may be converted into a target predicted motion vector in the target resolution, the target motion vector is obtained according to the target predicted motion vector and the motion vector difference, and then the target motion vector is converted into the first motion vector in the resolution of the video frame. The initial predicted motion vector may alternatively be converted into a predicted motion vector in the resolution of the video frame, the motion vector difference is converted into a motion vector difference in the solution of the video frame, and the first motion vector is obtained according to the motion vector difference in the resolution of the video frame and the predicted motion vector in the resolution of the video frame.

Step S1208: Process the reconstructed video frame according to the resolution information corresponding to the video frame to be decoded, to obtain a corresponding decoded video frame.

For example, processing performed on the reconstructed video frame by the computer device may be sampling, for example, upsampling. A method for processing the reconstructed video frame may correspond to a method for processing the input video frame during encoding. For example, when the processing mode of the input video frame is the downsampling processing mode, and the resolution information is a 1/2 downsampling proportion, the reconstructed video frame is upsampled, and the upsampling proportion may be 2.

In an embodiment, when the computer device determines, from header information of the encoded data, that the encoded data is obtained through encoding by using the downsampling processing mode, the decoder may also obtain, from the header information, the used downsampling proportion information or downsampling method information, and upsample the reconstructed video frame by using an upsampling proportion and an upsampling method that match the downsampling proportion information or the downsampling method information, to obtain the decoded video frame. For example, the sampling proportion corresponding to the downsampling proportion information is 1/2, and the decoder needs to upsample the reconstructed video frame by using a sampling proportion of 2 and an upsampling method that matches the downsampling method information, to obtain the decoded video frame. The decoder may obtain, from any one of sequence-level header information, group-level header information, and frame-level header information, downsampling proportion information or downsampling method information corresponding to the current encoded data.

In an embodiment, when the target processing mode corresponding to the video frame is the upsampling processing mode, that is, the target processing mode of the input video frame corresponding to the video frame at the encoder is the upsampling processing mode, the reconstructed video frame may not be downsampled, to ensure quality of the reconstructed video frame.

According to the foregoing video decoding method, the encoded data corresponding to the video frame is obtained, the resolution information corresponding to the video frame is obtained, the encoded data is decoded according to the resolution information corresponding to the video frame, to obtain the reconstructed video frame corresponding to the video frame, and the reconstructed video frame is processed according to the resolution information corresponding to the video frame, to obtain the corresponding decoded video frame. Therefore, during decoding, decoding may be flexibly performed according to the resolution information corresponding to the video frame, to obtain the decoded video frame, and decoding is performed according to the resolution information of the video frame, so that an accurate decoded video frame can be obtained.

In an embodiment, reconstructed video frames corresponding to video frames of the video sequence are processed into the same resolution, and for example, the reconstructed video frame is processed into a decoded video frame that has a resolution the same as the original resolution of the input video frame.

Figure 13:
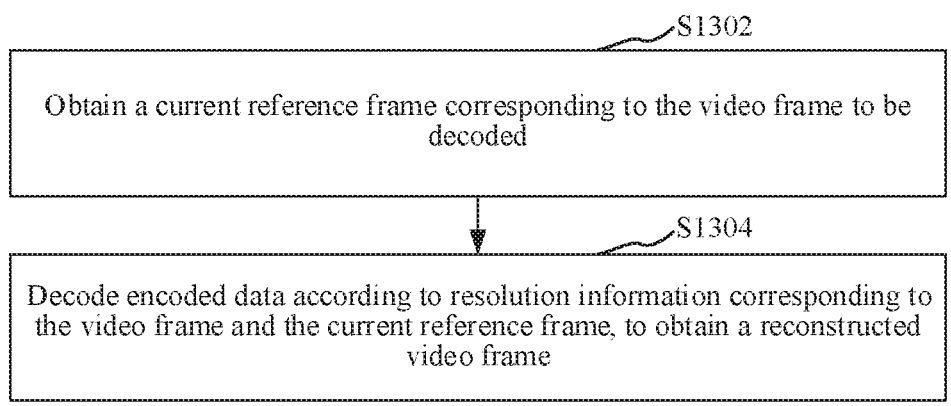
FIG. 13 is a flowchart of decoding encoded data according to resolution information corresponding to a video frame to be decoded, to obtain a reconstructed video frame corresponding to the video frame according to an embodiment.

In an embodiment, as shown in FIG. 13, step S1206, that is, decoding encoded data according to resolution information corresponding to a video frame to be decoded, to obtain a reconstructed video frame corresponding to the video frame includes the following steps:

Step S132: Obtain a reference frame corresponding to the video frame to be decoded.

For example, there may be one or more reference frames corresponding to the to be decoded video frame. For example, when the video frame is a P frame, there may be one corresponding reference frame. When the video frame is a B frame, there may be two corresponding reference frames. A reference frame corresponding to the video frame may be obtained according to a reference relationship, and the reference relationship may be different according to each video encoding and decoding standard. For example, when the second video frame in a video image group is a B frame, a corresponding video frame may be an I frame of the groups of pictures and the fourth frame of the groups of pictures. Alternatively, the reference frame corresponding to the video frame may be first one or two frames in forward encoded frames thereof. It may be understood that, the reference frame is consistent with the reference frame in the encoding process.

In an embodiment, the obtaining a reference frame corresponding to the video frame includes: obtaining a second reference rule, the second reference rule including a size relationship between a resolution of the video frame and a resolution of the reference frame; and obtaining the reference frame corresponding to the video frame according to the second reference rule.

For example, the second reference rule determines the size relationship between the resolution of the video frame and the resolution of the reference frame. It may be understood that, the first reference rule is consistent with the second reference rule, so that consistency between the reference frame obtained in the encoding process and the reference frame obtained in the decoding process is ensured. The first reference rule and the second reference rule may be set in an encoding and decoding standard. Alternatively, during encoding, the first reference rule may be selected according to an application scenario, a real-time performance requirement, and the like of encoding, and reference rule information is added to the encoded data. The computer device obtains the second reference rule according to the reference rule information in the encoded data. The resolution size relationship includes that the video frame is the same as or different from the reference frame. When the second reference rule includes that the resolution of the video frame is the same as the resolution of the reference frame, the second reference rule may further include a processing mode reference rule of the resolution of the video frame and the reference frame. For example, the processing mode reference rule may include one or two of the following: a video frame to be decoded with a full-resolution processing mode may refer to a reference frame with a full-resolution processing mode, and a video frame with a downsampling processing mode may refer to a reference frame with a downsampling processing mode. When the second reference rule includes that the resolution of the video frame is different from the resolution of the reference frame, the second reference rule may further include one or two of the following: the resolution of the video frame is greater than or less than the resolution of the reference frame. Therefore, the second reference rule may include one or more of the following: a video frame to be decoded with an original resolution may refer to a reference frame with a downsampling resolution, a video frame to be decoded with a downsampling resolution may refer to a reference frame with an original resolution, a video frame to be decoded with an original resolution may refer to a reference frame with an original resolution, and a video frame to be decoded with a downsampling resolution may refer to a reference frame with a downsampling resolution. The video frame to be decoded with an original resolution refers to that the resolution of the video frame is the same as the resolution of the corresponding input video frame, and the reference frame with an original resolution refers to that the resolution of the reference frame is the same as the resolution of the corresponding input video frame. The video frame to be decoded with a downsampling resolution refers to that resolution information corresponding to the video frame is downsampling. The reference frame with a downsampling resolution refers to that the resolution information corresponding to the reference frame is downsampling. After the second reference rule is obtained, the reference frame corresponding to the video frame is obtained according to the second reference rule, so that the obtained reference frame meets the second reference rule.

Step S1304: Decode the encoded data according to the resolution information corresponding to the video frame and the reference frame, to obtain the reconstructed video frame corresponding to the video frame.

For example, the computer device may obtain, from the reference frame, a reference block corresponding to a block of the video frame, and decode the block according to the reference block. The computer device may alternatively process the reference frame according to the resolution information of the video frame, to obtain a corresponding target reference frame, obtain, from the target reference frame, a target reference block corresponding to the block of the video frame, and decode the block according to the target reference block, to obtain the reconstructed video frame corresponding to the video frame.

In an embodiment, step S1304, that is, decoding the encoded data according to the resolution information corresponding to the video frame and the reference frame, to obtain the reconstructed video frame corresponding to the video frame includes: sampling the reference frame according to the resolution information corresponding to the video frame, to obtain a corresponding target reference frame; and decoding the video frame according to the target reference frame, to obtain the reconstructed video frame corresponding to the video frame.

For example, the computer device obtains the target reference block from the target reference frame according to carried motion vector information, obtains a predicted value corresponding to the block according to the target reference block, and obtains the reconstructed video frame according to a prediction residual in the encoded data and the predicted value.

In an embodiment, the sampling the reference frame according to the resolution information corresponding to the video frame, to obtain a corresponding target reference frame includes: sampling the reference frame according to the resolution information of the video frame and motion estimation pixel precision, to obtain the corresponding target reference frame.

In an embodiment, the sampling the reference frame according to the resolution information of the video frame and motion estimation pixel precision, to obtain the corresponding target reference frame includes: calculating pixel interpolation precision according to the resolution information of the video frame and the motion estimation pixel precision; and directly performing subpixel interpolation on the reference frame according to the pixel interpolation precision, to obtain the corresponding target reference frame.

In an embodiment, the sampling the reference frame according to the resolution information of the video frame and motion estimation pixel precision, to obtain the corresponding target reference frame includes: sampling the reference frame according to the resolution information of the video frame, to obtain an intermediate reference frame; and performing subpixel interpolation on the intermediate reference frame according to the motion estimation pixel precision, to obtain the target reference frame.

For example, the resolution of the video frame is consistent with the resolution of the video frame, and the obtained target reference frames are also consistent. Therefore, a method for sampling the reference frame according to the resolution information corresponding to the video frame, to obtain the corresponding target reference frame is consistent with a method for sampling the reference frame according to the resolution information of the frame in the encoder, to obtain the corresponding target reference frame. Details are not described herein again in this embodiment of this application.

In an embodiment, the decoder may also obtain, from header information of the encoded data, sampling mode information corresponding to the video frame. The decoder may obtain, from any one of sequence-level header information, group-level header information, and frame-level header information, subpixel interpolation mode information corresponding to the video frame. For example, when a flag bit Pixel_Sourse_Interpolation used for determining the sampling mode in the frame-level header information of the encoded data is 0, it indicates that the subpixel interpolation is directly performed on the reference frame corresponding to the input video frame; and when Pixel_Sourse_Interpolation is 1, it indicates that sampling is first performed on the reference frame corresponding to the input video frame, and then subpixel interpolation is performed on the reference frame. The decoder may perform subpixel interpolation on the reference frame in a mode the same as the subpixel interpolation mode indicated by the flag bit in the encoded data, to obtain the target reference frame, so that the encoded data may be decoded according to the target reference frame, to obtain the reconstructed video frame.

Figure 14:
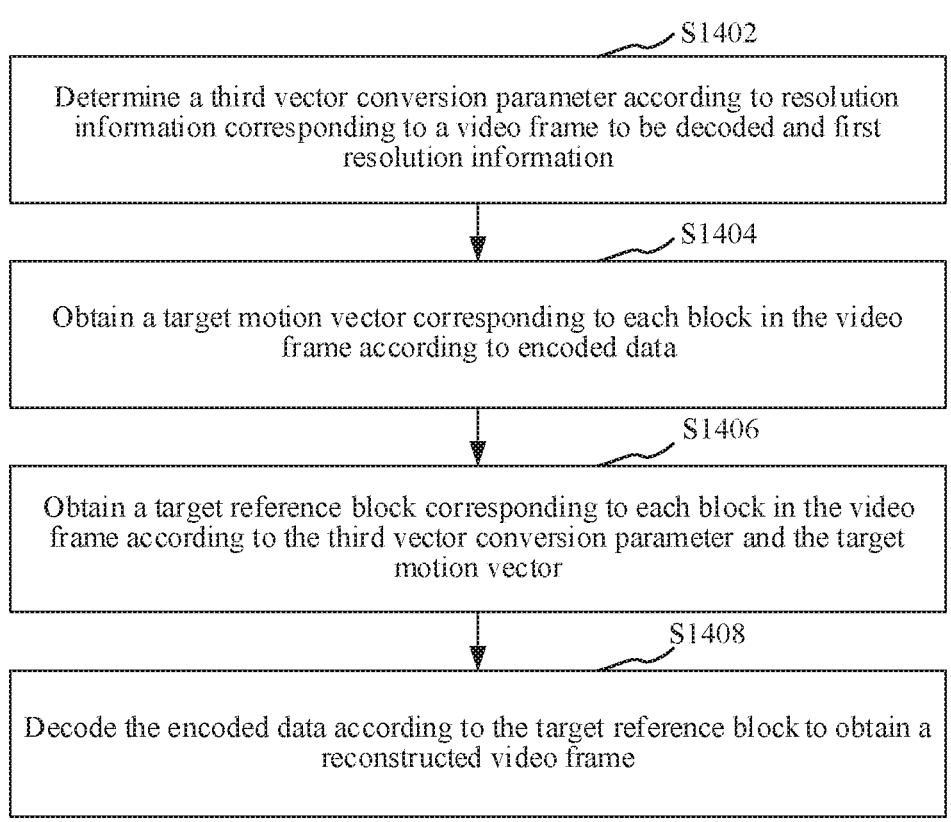
FIG. 14 is a flowchart of decoding encoded data according to resolution information corresponding to a video frame to be decoded and a reference frame, to obtain a reconstructed video frame corresponding to the video frame according to an embodiment.

In an embodiment, as shown in FIG. 14, step S1304, that is, decoding the encoded data according to the resolution information corresponding to the video frame and the reference frame, to obtain the reconstructed video frame corresponding to the video frame includes the following steps:

Step S1402: Determine a third vector conversion parameter according to the resolution information corresponding to the video frame and first resolution information, the first resolution information including target motion vector unit resolution information or resolution information of the reference frame.

For example, the third vector conversion parameter is used for converting location information of an obtained motion vector or the motion vector. The third vector conversion parameter may be a ratio of the first resolution information to the resolution information of the video frame, and the third vector conversion parameter corresponds to the first vector conversion parameter. When the target motion vector is converted by using the third vector conversion parameter, the target motion vector may be converted into a motion vector corresponding to a resolution corresponding to the video frame, and the third vector conversion parameter may be a reciprocal of the first vector conversion parameter. When location information corresponding to the motion vector is converted by using the third vector conversion parameter, if the first vector conversion parameter in the encoder is used for converting the first location information, because the location information of the block is the same as that of the code block, the third vector conversion parameter is the same as the first vector conversion parameter. If the first vector conversion parameter in the encoder is used for converting the second location information, because a location value calculated according to the target motion vector and the first location information is a location value obtained after converting the second location information according to the first vector conversion parameter in the encoder, the third vector conversion parameter is a reciprocal of the first vector conversion parameter.

Step S1404: Obtain a target motion vector corresponding to each block in the video frame to be decoded according to the encoded data.

For example, when the encoded data carries the target motion vector, the computer device reads the target motion vector from the encoded data. When the encoded data carries the motion vector difference, the computer device may calculate the target predicted motion vector, and obtain the target motion vector according to the motion vector difference and the target predicted motion vector.

Step S1406: Obtain a target reference block corresponding to each block in the video frame according to the third vector conversion parameter and the target motion vector.

For example, after obtaining the third vector conversion parameter, the computer device converts the obtained motion vector or the location information corresponding to the motion vector according to the third vector conversion parameter, to obtain the location information corresponding to the target reference block, and obtain the target reference block.

Step S1408: Decode the encoded data according to the target reference block, to obtain a reconstructed video frame corresponding to the video frame.

For example, after obtaining the target reference block, the computer device obtains a pixel value of each image block of the reconstructed video frame according to a pixel value of the target reference block and the prediction residual that is of the block and that is carried in the encoded data, to obtain the reconstructed video frame.

In an embodiment, step S1402, that is, determining a third vector conversion parameter according to the resolution information corresponding to the video frame and first resolution information includes: determining a third vector conversion parameter according to the resolution information corresponding to the video frame and resolution information of the reference frame, and step S1406, that is, obtaining a target reference block corresponding to each block in the video frame according to the third vector conversion parameter and the target motion vector includes: obtaining first location information corresponding to a current block; and obtaining a target reference block corresponding to the current block according to the first location information, the third vector conversion parameter, and the target motion vector.

For example, the computer device may obtain the second location information corresponding to the target reference block according to the first location information, the third vector conversion parameter, and the target motion vector, and obtain the target reference block according to the second location information. Due to correspondence between encoding and decoding, if the first vector conversion parameter in the encoder is used for converting the first location information because the location information of the block is the same as that of the code block, the third vector conversion parameter is the same as the first vector conversion parameter. If the first vector conversion parameter in the encoder is used for converting the second location information, because a location value calculated according to the target motion vector and the first location information is a location value obtained after converting the second location information according to the first vector conversion parameter in the encoder, the third vector conversion parameter is a reciprocal of the first vector conversion parameter.

For example, the resolution of the video frame is 1200*1200 pixels, and the resolution of the reference frame is 600*600 pixels. The first vector conversion parameter is used for converting the second location information, the first vector conversion parameter is 2, and the third vector conversion parameter is 1/2. Assuming that the first location information is (6, 8), and the target motion vector is (0, 2), the intermediate location information is (6, 8)–(0, 2)=(6, 6), and the second location information corresponding to the target reference block is (6*1/2, 6*1/2)=(3, 3).

For example, the resolution of the video frame is 1200*1200 pixels, the resolution of the reference frame is 600*600 pixels, the first vector conversion parameter is used for converting the first location information, the first vector conversion parameter is 1/2, and the third vector conversion parameter is 1/2. Assuming that the first location information is (6, 8), the target motion vector is (0, 1), and the second location information is (6*1/2, 8*1/2)–(0, 1)=(3, 3).

In an embodiment, step S1402, that is, determining a third vector conversion parameter according to the resolution information corresponding to the video frame and first resolution information includes: determining a third vector conversion parameter according to the resolution information corresponding to the video frame and target motion vector unit resolution information, and step S1406, that is, obtaining a target reference block corresponding to each block in the video frame according to the third vector conversion parameter and the target motion vector includes: obtaining a first motion vector according to the target motion vector and the third vector conversion parameter; and obtaining a target reference block corresponding to a current block according to the first motion vector.

For example, the third vector conversion parameter is determined according to the resolution information corresponding to the video frame and the target motion vector unit resolution information, and is used for converting the target motion vector into a first motion vector corresponding to the resolution corresponding to the frame. After obtaining the third vector conversion parameter, the computer device may multiply the third vector conversion parameter with the target motion vector, and use the obtained product as the first motion vector. It may be understood that, the process of obtaining the first motion vector according to the third vector conversion parameter and the target motion vector is an inverse process of obtaining the target motion vector corresponding to the current code block according to the first vector conversion parameter and the first motion vector. For example, it is assumed that in the encoder, the first vector conversion parameter of the code block corresponding to the block is equal to 2. The obtained first motion vector is (2, 2), and the target motion vector obtained according to a product of the first vector conversion parameter and the first motion vector (2, 2) is (4, 4). Then, in the decoding process, the third vector conversion parameter is 1/2, the obtained target motion vector is (4, 4), and the first motion vector obtained according to a product of the third vector conversion parameter 1/2 and the target motion vector (4, 4) is (2, 2).

In an embodiment, when the encoded data carries the motion vector difference, the obtaining a target motion vector corresponding to each block in the video frame according to the encoded data includes: obtaining a motion vector difference corresponding to a current block in the video frame according to the encoded data obtaining an initial predicted motion vector corresponding to the current block; obtaining a second vector conversion coefficient according to current motion vector unit resolution information corresponding to the initial predicted motion vector and the target motion vector unit resolution information; obtaining a target predicted motion vector corresponding to the current block according to the initial predicted motion vector and the second vector conversion coefficient; and obtaining the target motion vector according to the target predicted motion vector and the motion vector difference.

For example, because the block in the decoding process corresponds to the block in the encoding process, and initial predicted motion vector obtaining rules are the same, the initial predicted motion vector corresponding to the current block is consistent with the initial predicted motion vector corresponding to the current block, and for the method for obtaining the target predicted motion vector by the computer device, reference may be made to the method in the encoding process, and details are not described herein again. The target motion vector is a sum of the target predicted motion vector and the motion vector difference.

In an embodiment, a proportion of a target predicted type decoding block in a forward decoded video frame corresponding to the video frame may also be calculated; a target processing mode corresponding to the video frame is determined according to the proportion; and the resolution information corresponding to the video frame is obtained according to the target processing mode.

For example, the target processing mode corresponding to the video frame is consistent with the target processing mode of the corresponding input video frame in the encoder, that is, the target processing mode corresponding to the video frame is a target processing mode of an input video frame corresponding to the video frame. The target predicted type decoding block corresponds to the target predicted type code block. The forward decoded video frame is a video frame decoded before the video frame is decoded. The forward decoded video frame also corresponds to the forward encoded video frame. Therefore, a method for calculating the proportion of the target predicted type code block obtained by the encoder and the calculation result are also consistent with a method for calculating the proportion of the target predicted type decoding block obtained by the decoder and the calculation result. For the method for obtaining the proportion of the target predicted type decoding block, reference may be made to the method for obtaining the proportion of the target predicted type code block. Details are not described herein again. After the target processing mode is obtained, when the target processing mode is the full-resolution processing mode, the corresponding resolution information is an original resolution. When the target processing mode is the downsampling processing mode, a preset downsampling proportion is obtained, or a downsampling proportion is obtained from header information of the encoded data.

In an embodiment, the computer device may calculate a proportion of an intra-frame decoding block of the forward decoded video frame in the forward decoded video frame. When the proportion is greater than the target threshold, the target processing mode is determined as the downsampling processing mode.

For the proportion corresponding to the intra-frame decoding block, when the proportion is greater than the target threshold, the target processing mode corresponding to the video frame may be determined as the downsampling processing mode, and otherwise, the target processing mode corresponding to the video frame is determined as the full-resolution processing mode. For example, when the proportion is greater than the target threshold, the computer device determines that the target processing mode corresponding to the video frame is the downsampling processing mode, and otherwise, determines that the target processing mode corresponding to the video frame is the full-resolution processing mode.

The target threshold may be determined according to a processing mode of the reference frame corresponding to the video frame. When the processing mode of the reference frame corresponding to the video frame is the downsampling mode, the computer device obtains a first reference threshold T1, and uses the first reference threshold T1 as the target threshold. Similarly, when the processing mode of the reference frame corresponding to the video frame is the full-resolution processing mode, the computer device obtains the second reference threshold T2, and uses the second reference threshold T2 as the target threshold. Further, after the target threshold is obtained according to the resolution information of the reference frame corresponding to the video frame, the processing mode of the video frame is determined according to the target threshold and the proportion of the intra-frame decoding block of the forward decoded video frame in the forward decoded video frame. When the proportion of the intra-frame decoding block of the forward decoded video frame in the forward decoded video frame is greater than the target threshold, the target processing mode corresponding to the video frame is determined as the downsampling processing mode.

In an embodiment, before the obtaining encoded data corresponding to a video frame, the method further includes: obtaining a video sequence corresponding to the video frame to be decoded, and obtaining a target video sequence decoding mode corresponding to the video sequence, the target video sequence decoding mode including a constant resolution decoding mode or a hybrid resolution decoding mode; performing the hybrid resolution video decoding method on each video frame of the video sequence in a case that the target video sequence decoding mode is the hybrid resolution decoding mode; and performing constant resolution decoding on the video sequence in a case that the video sequence decoding mode is the constant resolution decoding mode.

For example, the computer device may obtain video sequence encoding mode information from the encoded data, and obtain the video sequence decoding mode according to the video sequence encoding mode information. For example, when the video sequence encoding mode corresponding to the video sequence encoding mode information is the constant resolution encoding mode, the corresponding video sequence decoding mode is the constant resolution decoding mode. In the constant resolution decoding mode, resolutions of video frames of the video sequence are consistent. When the video sequence encoding mode corresponding to the video sequence encoding mode information is the hybrid resolution encoding mode, the corresponding video sequence decoding mode is the hybrid resolution decoding mode. That is, video frames in the video sequence have different resolutions.

In an embodiment, the computer device may also determine, from header information of the encoded data, a decoding framework corresponding to the video frame. For example, the computer device may obtain, from sequence-level header information corresponding to the encoded data, an encoding framework used when each input video frame in the input video frame sequence corresponding to the current encoded data is encoded, to determine a decoding framework that is of the video frame and that matches the encoding framework. For example, when a flag bit Sequence_Mix_Flag used for determining the used encoding framework in the sequence-level header information of the encoded data is 0, it indicates that the encoding framework with a constant resolution is used when each input video frame in the input video frame sequence is encoded, and the decoder may decode the encoded data by using a decoding framework with a constant resolution, to obtain a reconstructed video frame corresponding to the video frame. When flag bit Sequence_Mix_Flag is 1, it indicates that the encoding framework with a hybrid resolution is used when each input video frame in the input video frame sequence is encoded, and the decoder may decode the encoded data by using a decoding framework with a hybrid resolution, to obtain a reconstructed video frame sequence.

In an embodiment, the obtaining a target video sequence decoding mode corresponding to the video sequence may include: obtaining current environmental information, the current environmental information including at least one of current encoding environmental information and current decoding environmental information; and determining the target video sequence decoding mode corresponding to the video sequence according to the current environmental information.

For example, the computer device may also obtain the corresponding target video sequence decoding mode by using a method for calculating the video sequence encoding mode by the encoder. Therefore, in this embodiment of this application, determining the target video sequence decoding mode according to current environmental information is consistent with determining the target video sequence encoding mode according to the current environmental information, and details are not described herein again.

In an embodiment, the current environmental information includes an application scenario corresponding to the video sequence, and the video sequence decoding mode corresponding to the video sequence may be obtained according to the application scenario.

The video decoding method is described below by using decoding encoded data corresponding to a video sequence A as an example. For the encoded data of the video sequence A, reference may be made to the exemplary descriptions in the foregoing video encoding method. It is assumed that names of video frames corresponding to input video frames a, b, and c at the decoder are respectively e, f, and g.

1. A receiving terminal obtains the encoded data corresponding to the video sequence A, and obtains, from sequence header information corresponding to the encoded data, that the target video sequence encoding mode is the hybrid resolution encoding mode, and therefore, the encoded data is decoded by using a hybrid resolution decoding framework.

2. A resolution information obtaining unit of the hybrid resolution decoding framework obtains resolution information corresponding to the first video frame e. It may be understood that, encoded data corresponding to e is data obtained by encoding a1. Intra-frame decoding is performed on e, to obtain a reconstructed video frame e1. Because resolution information corresponding toe is 1/2, the reconstructed video frame e1 may be upsampled by using a sampling proportion of 2, to obtain a decoded video frame e2.

3. A resolution information obtaining unit of the hybrid resolution decoding framework obtains resolution information corresponding to the second video frame f. It may be understood that, encoded data corresponding to f is data obtained by encoding b1. Inter-frame decoding is performed on f, to obtain a reconstructed video frame f1. Because resolution information corresponding to f is a downsampling proportion of 1/4, the reconstructed video frame f1 may be upsampled by using a sampling proportion of 4, to obtain a decoded video frame f2, The decoding process is as follows: because f is an inter predicted frame, the reconstructed video frame e1 needs to be used as the reference frame. It may be understood that, e1 is the same as a2, and sampling the same as that performed on a2 is performed on e1, to obtain e3, and herein, e3 is the same as a3, and is a target reference frame. It is obtained from the encoded data that the motion vector difference corresponding to the current block is MVD1, because MVD1 is in the target resolution, that is, the original resolution, MVD1 needs to be converted to be in a resolution corresponding to f, and therefore, it may be obtained that MVD3 is MVD1/4. It is obtained that an initial predicted vector is MV2. The initial predicted vector is calculated in a resolution corresponding to the 1/4 downsampling proportion, and the resolution is the same as a resolution corresponding to f. Therefore, it may be obtained that the first motion vector is MV1, equal to MVD1/4+MV2. The target reference block is obtained according to MV1. A predicted value corresponding to the block is obtained according to the target reference block, and the reconstructed block corresponding to the reconstructed video frame f1 is obtained by adding the prediction residual p1 and the predicted value and reconstruction.

4. A resolution information obtaining unit of the hybrid resolution decoding framework obtains encoded data corresponding to the third video frame g. It may be understood that, the encoded data corresponding to g is data obtained by encoding c1. Inter-frame decoding is performed on g, to obtain a reconstructed video frame g1. Because resolution information corresponding to g is 1/8, the reconstructed video frame f1 may be upsampled by using a sampling proportion of 8, to obtain a decoded video frame g2.

The decoding process is as follows: because g is an inter predicted frame, the reconstructed video frame f1 needs to be used as the reference frame. It may be understood that, f1 is the same as b2. Sampling the same as that performed on b2 is performed on f1, to obtain f3. Herein, f3 is the same as b3, and is a target reference frame. It is obtained from the encoded data that the motion vector difference corresponding to the current block is MVD2, because MVD2 is in the target resolution, that is, the original resolution, MVD2 needs to be converted to be in a resolution corresponding to g, and therefore, it may be obtained that MVD2 is MVD1/8. It is obtained that an initial predicted vector is MV4, and because the initial predicted vector is calculated in a resolution corresponding to the 1/4 downsampling proportion, the initial predicted vector needs to be converted to be in a resolution corresponding to f. A downsampling proportion corresponding to f is 1/8. Therefore, it may be obtained that the first motion vector is MV3, equal to MVD2/8+MV4/2.

The target reference block is obtained according to MV3. A predicted value corresponding to the block is obtained according to the target reference block, and the reconstructed block corresponding to the reconstructed video frame g1 is obtained by adding the prediction residual p2 and the predicted value and reconstruction.

5. The receiving terminal plays e2, f2, and g2.

Figure 15:
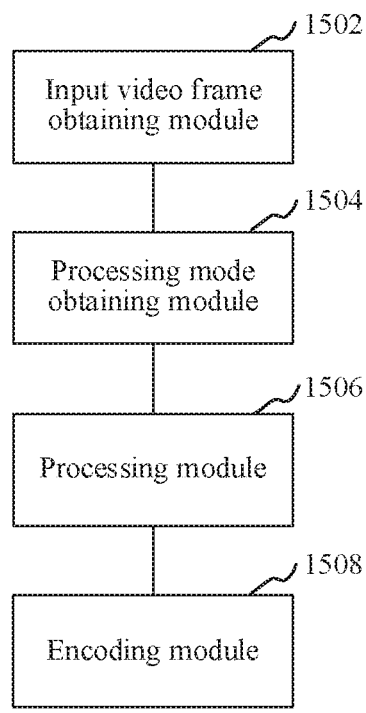
FIG. 15 is a structural block diagram of a video encoding apparatus according to an embodiment.

As shown in FIG. 15, in an embodiment, a video encoding apparatus is provided. The video encoding apparatus may be integrated into the foregoing server 120 or terminal 110, and may include an input video frame obtaining module 1502, a processing mode obtaining module 1504, a processing module 1506, and an encoding module 1508.

The input video frame obtaining module 1502 is configured to obtain an input video frame.

The processing mode obtaining module 1504 is configured to determine, from candidate processing modes, a target processing mode corresponding to the input video frame, the candidate processing modes including a full-resolution processing mode and a downsampling processing mode.

The processing module 1506 is configured to process the input video frame according to the target processing mode, to obtain a frame to be encoded.

The encoding module 1508 is configured to encode the frame according to resolution Information corresponding to the frame, to obtain encoded data corresponding to the input video frame.

In an embodiment, the encoding module 1508 is further configured to: add target processing mode information corresponding to the target processing mode to the encoded data corresponding to the input video frame.

In an embodiment, the processing mode obtaining module 1504 is configured to: obtain a processing parameter corresponding to the input video frame, and determine the target processing mode corresponding to the input video frame according to the processing parameter; and the adding target processing mode information corresponding to the target processing mode to the encoded data corresponding to the input video frame includes: adding the target processing mode information corresponding to the target processing mode to the encoded data corresponding to the input video frame in a case that the processing parameter cannot be reproduced in a decoding process.

In an embodiment, the encoding module 1508 includes:
a reference frame obtaining unit, configured to obtain a reference frame corresponding to the frame; and
an encoding unit, configured to encode the frame according to the resolution information corresponding to the frame and the reference frame, to obtain the encoded data corresponding to the input video frame.

In an embodiment, the encoding unit is configured to: determine a first vector conversion parameter according to the resolution information of the frame and first resolution information, the first resolution information including resolution information of the reference frame or target motion vector unit resolution information corresponding to the input video frame; and obtain a target motion vector corresponding to each code block in the frame according to the first vector conversion parameter.

In an embodiment, the encoding module 1508 is configured to: sample the reference frame according to the resolution information of the frame, to obtain a corresponding target reference frame; and encode the frame according to the target reference frame, to obtain the encoded data corresponding to the input video frame.

Figure 16:
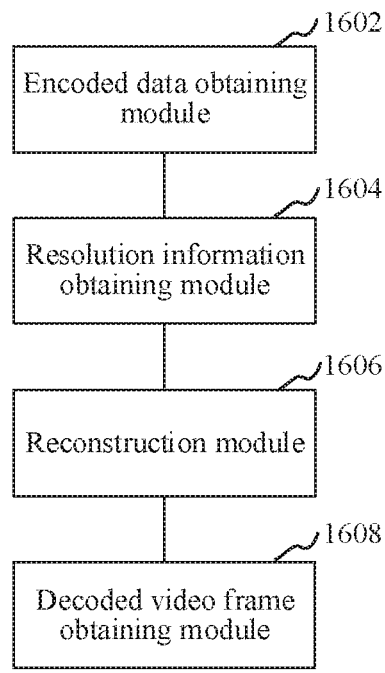
FIG. 16 is a structural block diagram of a video decoding apparatus according to an embodiment.

As shown in FIG. 16, in an embodiment, a video decoding apparatus is provided. The video decoding apparatus may be integrated into the foregoing server 120 or terminal 110, and may specifically include an encoded data obtaining module 1602, a resolution information obtaining module 1604, a reconstruction module 1606, and a decoded video frame obtaining module 1608.

The encoded data obtaining module 1602 is configured to obtain encoded data corresponding to a video frame to be decoded.

The resolution information obtaining module 1604 is configured to obtain resolution information corresponding to the video frame to be decoded.

The reconstruction module 1606 is configured to decode the encoded data according to the resolution information corresponding to the video frame, to obtain a reconstructed video frame corresponding to the video frame.

The decoded video frame obtaining module 1608 is configured to process the reconstructed video frame according to the resolution information corresponding to the video frame, to obtain a corresponding decoded video frame.

In an embodiment, the resolution information obtaining module 1604 is configured to: read target processing mode information from the encoded data, and obtain the resolution information corresponding to the video frame according to the target processing mode information.

In an embodiment, the resolution information obtaining module 1604 is configured to: calculate a proportion of a target predicted type decoding block in a forward decoded video frame corresponding to the video frame; determine a target processing mode corresponding to the video frame according to the proportion; and obtain the resolution information corresponding to the video frame according to the target processing mode.

In an embodiment, the reconstruction module 1606 is configured to: obtain a reference frame corresponding to the video frame; and decode the encoded data according to the resolution information corresponding to the video frame and the reference frame, to obtain the reconstructed video frame corresponding to the video frame.

When the apparatuses provided in the foregoing embodiments implement the functions of the apparatuses, only division of the foregoing function modules is used as an example for description. In the practical application, the functions may be allocated to and completed by different function modules according to requirements. That is, an internal structure of the apparatus is divided into different function modules, to complete all or some of the functions described above. In addition, the apparatuses provided in the foregoing embodiments and the method embodiments fall within a same conception. For details of a specific implementation process, refer to the method embodiments. Details are not described herein again.

Figure 17:
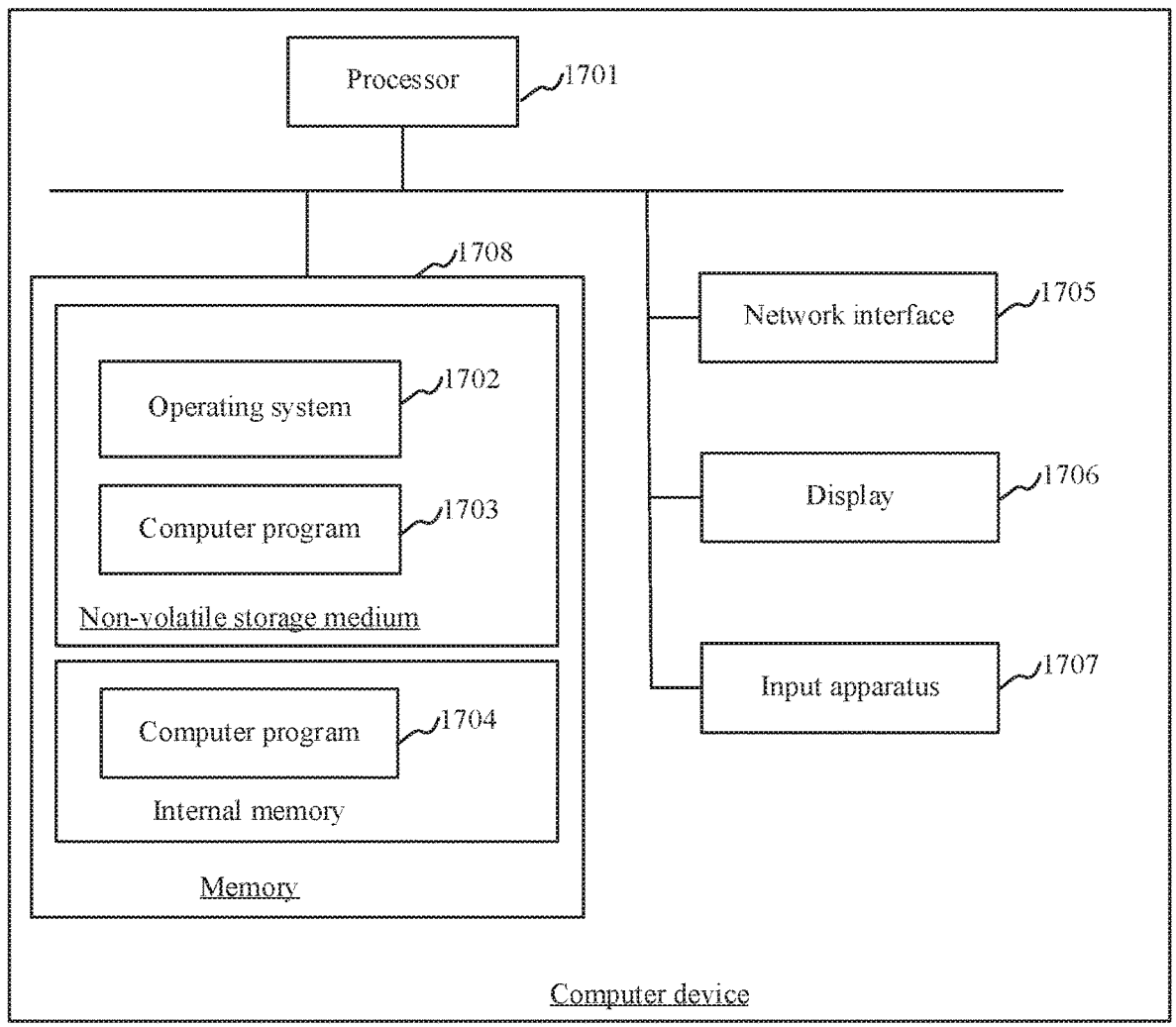
FIG. 17 is a block diagram of an internal structure of a computer device according to an embodiment.

FIG. 17 is a diagram of an internal structure of a computer device according to an embodiment. The computer device may be the terminal 110 in FIG. 1. As shown in FIG. 17, the computer device includes a processor 1701, a memory 1708, a network interface 1705, an input apparatus 1707, and a display 1706 that are connected through a system bus. The memory includes a non-volatile storage medium and an internal memory. The non-volatile storage medium of the computer device stores an operating system 1702, and may further store a computer program 1703. When executed by the processor 1701, the computer program 1703 may cause the processor 1701 to implement one or two methods in the video encoding method and the video decoding method. The internal memory may also store a computer program 1704.

When executed by the processor 1701, the computer program 1704 may cause the processor 1701 to perform one or two methods in the video encoding method and the video decoding method. The display 1706 of the computer device may be a liquid crystal display or an electronic ink display. The input apparatus 1707 of the computer device may be a touch layer covering the display, or may be a button, a trackball, or a touch panel disposed on a housing of the computer device, or may be an external keyboard, touch panel, or mouse.

Figure 18:
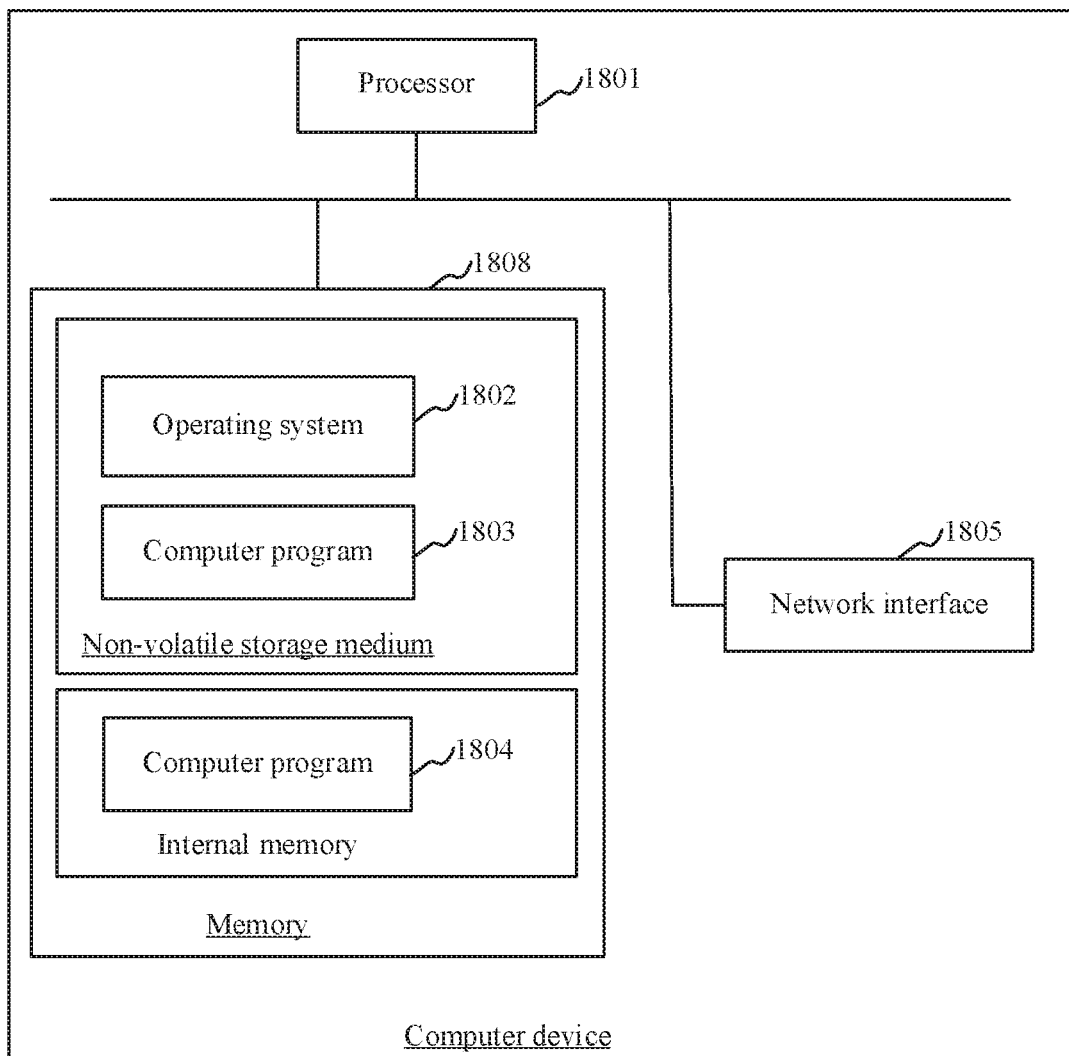
FIG. 18 is a block diagram of an internal structure of a computer device according to an embodiment.

FIG. 18 is a diagram of an internal structure of a computer device according to an embodiment. The computer device may be the server 120 in FIG. 1. As shown in FIG. 18, the computer device includes a processor 1801, a memory 1808, and a network interface 1805 that are connected through a system bus. The memory 1808 includes a non-volatile storage medium and an internal memory. The non-volatile storage medium of the computer device stores an operating system 1802, and may further store a computer program 1803. When executed by the processor 1801, the computer program 1803 may cause the processor 1801 to implement one or two methods in the video encoding method and the video decoding method. The internal memory may also store a computer program 1804. When executed by the processor 1801, the computer program 1804 may cause the processor 1801 to perform one or two methods in the video encoding method and the video decoding method.

A person skilled in the art may understand that the structure shown in FIG. 17 and FIG. 18 is merely a block diagram of a part of the structure related to the solution of this application, and does not constitute a limitation on a computer device to which the solution of this application is applied. In particular, the computer device may include more or fewer components than those shown in the figure, or some components may be combined, or a different component deployment may be used.

In an embodiment, the video encoding apparatus provided in this application may be implemented in a form of a computer program. The computer program may run on the computer device shown in FIG. 17 and FIG. 18. The memory of the computer device may store various program modules that form the video encoding apparatus, for example, the input video frame obtaining module 1502, the processing mode obtaining module 1504, the processing module 1506, and the encoding module 1508 that are shown in FIG. 15. The computer program formed by the various program modules causes the processor to perform the steps of the video encoding method in the embodiments of this application that are described in this specification.

For example, the computer device shown in FIG. 17 and FIG. 18 may obtain the input video frame by using the input video frame obtaining module 1502 in the video encoding apparatus shown in FIG. 15, determine, from the candidate processing modes, the target processing mode corresponding to the input video frame by using the processing mode obtaining module 1504, the candidate processing modes including the full-resolution processing mode and the downsampling processing mode; process the input video frame according to the target processing mode by using the processing module 1506, to obtain the frame, and encode the frame by using the resolution information corresponding to the frame by using the encoding module 1508, to obtain the encoded data corresponding to the input video frame.

In an embodiment, the video decoding apparatus provided in this application may be implemented in a form of a computer program. The computer program may run on the computer device shown in FIG. 17 and FIG. 18. The memory of the computer device may store various program modules that form the video decoding apparatus, for example, the encoded data obtaining module 1602, the resolution information obtaining module 1604, the reconstruction module 1606, and the decoded video frame obtaining module 1608 that are shown in FIG. 16. The computer program formed by the various program modules causes the processor to perform the steps of the video decoding method in the embodiments of this application that are described in this specification.

For example, the computer device shown in FIG. 17 and FIG. 18 may obtain the encoded data corresponding to the video frame by using the encoded data obtaining module 1602 in the video decoding apparatus shown in FIG. 16, obtain the resolution information corresponding to the video frame by using the resolution information obtaining module 1604, decode the encoded data according to the resolution information corresponding to the video frame by using the reconstruction module 1606, to obtain the reconstructed video frame corresponding to the video frame, process the reconstructed video frame according to the resolution information corresponding to the video frame by using the decoded video frame obtaining module 1608, to obtain the corresponding decoded video frame.

In an embodiment, a computer device is provided. The computer device includes a memory, a processor, and a computer program stored on the memory and capable of being run on the processor, and the processor performs any one of the foregoing video encoding methods when executing the computer program.

In an embodiment, a computer-readable storage medium is provided. The computer-readable storage medium stores a computer program, the computer program, when executed by a processor, causing the processor to perform any one of the video encoding methods.

In an embodiment, a computer device is provided. The computer device includes a memory, a processor, and a computer program stored on the memory and capable of being run on the processor, and the processor performs any one of the foregoing video decoding methods when executing the computer program.

In an embodiment, a computer-readable storage medium is provided. The computer-readable storage medium stores a computer program, the computer program, when executed by a processor, causing the processor to perform any one of the video decoding methods.

It is to be understood that although the steps in the flowcharts of the embodiments of this application are displayed in sequence according to arrows, the steps are not necessarily performed in the sequence indicated by the arrows. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or some of the processes of the methods in the foregoing embodiments may be implemented by a computer program instructing relevant hardware. The program may be stored in a non-volatile computer-readable storage medium. When the program is executed, the processes of the foregoing methods in the embodiments are performed. Any reference to a memory, a storage, a database, or another medium used in the embodiments provided in this application may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a rambus direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only show several implementations of this application, and descriptions thereof are relatively specific and detailed, but cannot be understood as a limitation to the patent scope of this application. A person of ordinary skill in the art may make various deformations and improvements without departing from the ideas of this application, and the deformations and improvements all fall within the protection scope of this application. Therefore, the protection scope of the patent of this application shall be subject to the appended claims.

What is claimed is:

1. A video encoding method comprising:
   obtaining a current frame from an input video;
   determining, from a plurality of processing modes, a target processing mode corresponding to the current frame;
   processing the current frame according to the target processing mode; and
   encoding the processed current frame according to resolution information to obtain encoded data corresponding to the current frame by:
      obtaining a reference frame corresponding to the processed current frame;
      determining a first vector conversion parameter according to the resolution information of the processed current frame and the resolution information of the reference frame;
      obtaining first location information corresponding to a current code block in the processed current frame;
      obtaining second location information corresponding to a target reference block corresponding to the current code block; and
      calculating a target motion vector corresponding to the current code block according to the first vector conversion parameter, the first location information, and the second location information.

2. The method of claim 1, wherein the method further comprises:
   subsequent to the encoding the processed current frame, adding target processing mode information corresponding to the target processing mode to the encoded data.

3. The method according to claim 2, wherein the determining the target processing mode comprises:
   obtaining a processing parameter corresponding to the current frame;
   determining the target processing mode according to the processing parameter; and
   the adding the target processing mode information to the encoded data comprises:
      adding the target processing mode information to the encoded data in response to the processing parameter failing to be reproduced in a decoding process of the encoded data.

4. The method of claim 1, wherein the encoding the processed current frame comprises:
   obtaining a reference frame corresponding to the processed current frame; and
   encoding the processed current frame according to the resolution information and the reference frame to obtain the encoded data.

5. The method according to claim 1, wherein the determining the first vector conversion parameter comprises:
   obtaining the target motion vector unit resolution information; and
   determining the first vector conversion parameter according to the resolution information of the processed current frame and the target motion vector unit resolution information; and
   the obtaining the target motion vector comprises:
      obtaining a first motion vector according to displacement between the current code block and the target reference block corresponding to the current code block; and
      obtaining the target motion vector corresponding to the current code block according to the first vector conversion parameter and the first motion vector.

6. The method according to claim 5, wherein the encoding the processed current frame comprises:
   obtaining an initial predicted motion vector corresponding to the current code block;
   obtaining a second vector conversion coefficient according to current motion vector unit resolution information corresponding to the initial predicted motion vector and the target motion vector unit resolution information;
   obtaining a target predicted motion vector corresponding to the current code block according to the initial predicted motion vector and the second vector conversion coefficient; and
   obtaining a motion vector difference according to the target motion vector and the target predicted motion vector.

7. The method according to claim 4, wherein the obtaining the reference frame comprises:
   obtaining a first reference rule, the first reference rule comprising a size relationship between a resolution of the processed current frame and a resolution of the reference frame; and
   obtaining the reference frame corresponding to the processed current frame according to the first reference rule.

8. The method according to claim 7, wherein subsequent to the encoding the processed current frame, the method further comprises:
   adding rule information corresponding to the first reference rule to the encoded data corresponding to the current frame.

9. The method of claim 4, wherein the encoding the processed current frame comprises:
sampling the reference frame according to the resolution information of the processed current frame, to obtain a target reference frame; and
encoding the processed current frame according to the target reference frame to obtain the encoded data.

10. The method according to claim 9, wherein the sampling the reference frame comprises:
sampling the reference frame according to the resolution information of the processed current frame and motion estimation pixel precision to obtain the target reference frame.

11. The method according to claim 10, wherein the sampling the reference frame comprises:
calculating pixel interpolation precision according to the resolution information of the processed current frame and the motion estimation pixel precision; and directly performing subpixel interpolation on the reference frame according to the pixel interpolation precision, to obtain the target reference frame.

12. The method according to claim 10, wherein the sampling the reference frame comprises:
sampling the reference frame according to the resolution information of the processed current frame, to obtain an intermediate reference frame; and
performing subpixel interpolation on the intermediate reference frame according to the motion estimation pixel precision, to obtain the target reference frame.

13. The method according to claim 9, wherein subsequent to the encoding the processed current frame, the method further comprises:
adding sampling mode information corresponding to the sampling performed on the reference frame to the encoded data.

14. The method of claim 1, wherein subsequent to the encoding the processed current frame, the method further comprises:
obtaining an encoding mode of encoding the processed current frame; and
adding encoding mode information corresponding to the encoding mode to the encoded data.

15. The method according to claim 1, wherein the plurality of processing modes comprise a full-resolution processing mode or a downsampling processing mode, and wherein determining the target processing mode from the plurality of processing modes comprises:
calculating a proportion of a target predicted type code block in a forward encoded video frame corresponding to the current frame; and
determining the target processing mode corresponding to the current frame according to the proportion.

16. The method according to claim 1, wherein the target processing mode is a downsampling processing mode, and the processing the current frame comprises:
downsampling the current frame to obtain the processed current frame; and
the method further comprises:
subsequent to encoding the processed current frame, adding downsampling processing mode information corresponding to the downsampling to the encoded data corresponding to the current frame.

17. A non-volatile computer-readable storage medium, storing a computer-readable instruction, the computer-readable instruction, when executed by one or more processors, causing the one or more processors to:
obtain a current frame from an input video;
determine, from a plurality of processing modes, a target processing mode corresponding to the current frame;
process the current frame according to the target processing mode; and
encode the processed current frame according to resolution information to obtain encoded data corresponding to the current frame by
obtainment of a reference frame corresponding to the processed current frame;
determination of a first vector conversion parameter according to the resolution information of the processed current frame and the resolution information of the reference frame;
obtainment of first location information corresponding to a current code block in the processed current frame;
obtainment of second location information corresponding to a target reference block corresponding to the current code block; and
calculation of a target motion vector corresponding to the current code block according to the first vector conversion parameter, the first location information, and the second location information.

18. The method according to claim 1, wherein the method further comprises:
obtaining an input video sequence corresponding to the current frame, and obtaining a target video sequence encoding mode corresponding to the input video sequence, the target video sequence encoding mode comprising a constant resolution encoding mode or a hybrid resolution encoding mode; and
encoding each input video frame of the input video sequence in a same way as encoding the processed current frame in response to the target video sequence encoding mode being the hybrid resolution encoding mode; and
encoding each input video frame of the input video sequence with constant resolution in response to the target video sequence encoding mode being the constant resolution encoding mode.

19. The method according to claim 18, wherein the obtaining the target video sequence encoding mode corresponding to the input video sequence comprises:
obtaining current environmental information, the current environmental information comprising processing capability information of a processor circuitry executing the video encoding method or current application scenario information for the input video; and
determining the target video sequence encoding mode corresponding to the input video sequence according to the current environmental information.

\* \* \* \* \*